(12) United States Patent  
Todo et al.

(10) Patent No.: US 9,385,381 B2
(45) Date of Patent: Jul. 5, 2016

(54) FUEL CELL STACK

(75) Inventors: Yusuke Todo, Iwakura (JP); Yosuke Ito, Kasugai (JP); Masahiro Shibata, Aichi-ken (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 143 days.

(21) Appl. No.: 14/345,432

(22) PCT Filed: Sep. 14, 2012

(86) PCT No.: PCT/JP2012/005887
§ 371 (c)(1),
(2), (4) Date: Mar. 18, 2014

(87) PCT Pub. No.: WO2013/038700
PCT Pub. Date: Mar. 21, 2013

(65) Prior Publication Data
US 2014/0349209 A1   Nov. 27, 2014

(30) Foreign Application Priority Data

Sep. 16, 2011 (JP) ................................ 2011-203478

(51) Int. Cl.
*H01M 8/04* (2006.01)
*H01M 8/24* (2016.01)
*H01M 8/12* (2016.01)

(52) U.S. Cl.
CPC ...... *H01M 8/04201* (2013.01); *H01M 8/04089* (2013.01); *H01M 8/24* (2013.01); *H01M 8/249* (2013.01); *H01M 8/04007* (2013.01); *H01M 2008/1293* (2013.01); *H01M 2250/00* (2013.01); *Y02E 60/50* (2013.01); *Y02E 60/525* (2013.01)

(Continued)

(58) Field of Classification Search
CPC ................... H01M 8/04089; H01M 8/04753; H01M 8/04761; H01M 8/04388; H01M 8/04395; H01M 8/04402; H01M 8/04104
See application file for complete search history.

(56) References Cited

U.S. PATENT DOCUMENTS 6,251,534 B1   6/2001 McElroy
6,794,068 B2   9/2004 Rapaport et al.
(Continued)

FOREIGN PATENT DOCUMENTS

EP      1942544 A1    7/2008
JP      61-49382 A    3/1986
(Continued)

OTHER PUBLICATIONS

Communication issued Apr. 10, 2015, by the European Patent Office in related Application No. 12831015.8.
(Continued)

*Primary Examiner* — Basia Ridley
*Assistant Examiner* — Heng Chan
(74) *Attorney, Agent, or Firm* — Sughrue Mion, PLLC

(57) ABSTRACT

A fuel cell stack has a first block having a first number of cells, a first fuel supply channel for supplying fuel gas to the first block, a collecting channel for collecting fuel gas which has passed through the first block, a second block having a second number of cells, the second number being smaller than the first number, a second fuel supply channel for supplying the second block with fuel gas which has been collected into the collecting channel, and a discharge channel for discharging fuel gas which has passed through the second block. A throttling section smaller in channel diameter than first and second fuel gas trunk channels, first and second branch channels, the collecting channel, and the discharge channel is provided downstream of the collecting channel and upstream of the second fuel supply channel.

8 Claims, 23 Drawing Sheets

(56) References Cited

U.S. PATENT DOCUMENTS

| | | |
|---|---|---|
| 2004/0043279 A1 | 3/2004 | Rapaport et al. |
| 2010/0248059 A1 | 9/2010 | Koji et al. |

FOREIGN PATENT DOCUMENTS

| | | |
|---|---|---|
| JP | 63119166 A | 5/1988 |
| JP | 2001256993 A | 9/2001 |
| JP | 2004207006 A | 7/2004 |
| JP | 2005216642 A | 8/2005 |
| JP | 2007018800 A | 1/2007 |
| JP | 2009206076 A | 9/2009 |
| WO | 2008153073 A1 | 12/2008 |

OTHER PUBLICATIONS

ISR (PCT/ISR) issued Oct. 9, 2010; in PCT/JP2012/005887.
Written Opinion (ISA/237) issued Oct. 9, 2010; in PCT/JP2012/005887.
Office Action dated Jul. 3, 2015, issued by the Canadian Intellectual Property Office in counterpart Canadian Application No. 2848556.

FUEL CELL STACK

TECHNICAL FIELD

The present invention relates to a fuel cell stack having fuel cells.

BACKGROUND ART

Known fuel cell stacks include a solid oxide fuel cell (hereinafter, may be referred to as an "SOFC") stack which uses a solid electrolyte (solid oxide). The SOFC stack uses, as an electric power generating unit, for example, a fuel cell in which an anode and a cathode are provided on one side and the other side, respectively, of a solid electrolyte layer. In order to obtain desired electric power, a plurality of the fuel cells are arranged in series, thereby forming a fuel cell stack. Fuel gas and oxidizer gas to be used for generating electric power flow along the surfaces of anodes and cathodes, respectively, and fuel gas and oxidizer gas which have been used for generating electric power are discharged from the fuel cell stack.

There is disclosed a method for improving power generation efficiency through enhancement of overall fuel utilization rate by dividing the fuel cell stack into two blocks which differ in the number of fuel cells (refer to Patent Documents 1 and 2). Fuel gas is supplied sequentially to a block having a large number of fuel cells (upstream section) and then to a block having a small number of fuel cells (downstream section). Fuel gas which is not used for generating electric power in the upstream section is used in the downstream section, whereby overall fuel utilization rate is improved.

PRIOR ART DOCUMENTS

Patent Documents

Patent Document 1: Japanese Patent Application Laid-Open (kokai) No. 2001-256993
Patent Document 2: International Publication No. WO/2008/153073
Patent Document 3: Japanese Patent Application Laid-Open (kokai) No. 2004-207006

SUMMARY OF THE INVENTION

Problem to be Solved by the Invention

Since the above-mentioned method involves a large number of fuel cells in the upstream section, fuel distribution to the fuel cells in the upstream section is likely to be imbalanced.

In order to achieve uniform fuel distribution to the fuel cells, there is disclosed a technique in which a discharge hole that restrains a gas flow rate is provided at an end portion at a discharge side of a fuel cell stack (refer to Patent Document 3).

However, if a discharge hole which restrains a gas flow rate is provided in the fuel cell stack divided into two blocks, the pressure loss of fuel gas may possibly increase. As a result, leakage of fuel gas may increase, bringing about the possibility of deterioration in power generation efficiency.

In view of the above, an object of the present invention is to provide a fuel cell stack having uniform fuel distribution and improved fuel utilization rate.

Means for Solving the Problem

A fuel cell stack according to a mode of the present invention comprises a first block having a first number of cells; a first fuel supply channel having a first fuel gas trunk channel and first branch channels branching off from the first fuel gas trunk channel, and adapted to parallelly supply the cells of the first block with fuel gas; a collecting channel for collecting the fuel gas which has passed through the cells of the first block; a second block having a second number of cells, the second number being smaller than the first number; a second fuel supply channel having a second fuel gas trunk channel, and adapted to parallelly supply the cells of the second block with the fuel gas which has passed through the cells of the first block and has been collected into the collecting channel; and a discharge channel for discharging the fuel gas which has passed through the cells of the second block, from the second block to an external section; and is configured such that the first fuel supply channel, the first block, the collecting channel, the second fuel supply channel, the second block, and the discharge channel are arranged sequentially from an upstream side along a direction of flow of the fuel gas, wherein a throttling section capable of throttling the fuel gas and smaller in channel diameter than the first and second fuel gas trunk channels, the first and second branch channels, the collecting channel, and the discharge channel is provided at a position located downstream of the collecting channel and upstream of the second fuel supply channel.

By virtue of the number of cells of the first block being larger than the number of cells of the second block, fuel gas which has not been used for generating electric power in the first block is consumed in the second block, whereby fuel gas can be effectively utilized. As a result, characteristics can be maintained at a fuel utilization rate higher than an ordinary fuel utilization rate, so that power generation efficiency can be improved.

Also, since the throttling section is smaller in channel diameter than the first and second fuel gas trunk channels, the first and second branch channels, the collecting channel, and the discharge channel and thus throttles fuel gas, the flow of fuel gas within the first block becomes uniform, so that distribution of fuel gas to the cells of the first block becomes uniform. Through flow of fuel gas in the order of the first fuel supply channel (the first fuel gas trunk channel and the first branch channels), the first block, the collecting channel, the throttling section, the second fuel supply channel (the second fuel gas trunk channel and the second branch channels), and the second block, pressure loss of fuel gas within the fuel cell stack can be reduced.

That is, in the fuel cell stack of the present invention, the stack of fuel cells is divided into two blocks (the first block and the second block). Fuel gas or oxidizer gas is supplied first to the block having a large number of fuel cells (the first block (upstream section)); subsequently, fuel gas or oxidizer gas which has not been used for generating electric power in the upstream section is supplied to the block having a small number of fuel cells (the second block (downstream section)).

Also, in the fuel cell stack of the present invention, the throttling section intervenes between the upstream section and the downstream section.

Since the upstream section is larger in the number of fuel cells than the downstream section, the upstream section can be operated easily at a high fuel utilization rate. Since the upstream section and the downstream section differ in the number of cells, the upstream section and the downstream section differ in fuel utilization rate, and the upstream section is highly likely to become greater in fuel utilization rate.

Thus, through provision of the throttling section (pressure loss body), fuel distribution in the upstream section having a high fuel utilization rate can be rendered uniform without involvement of an increase in pressure loss in the fuel gas channel. As a result, power generation efficiency can be improved. Furthermore, through provision of the throttling section, a gas waste heat path can be elongated.

Meanwhile, the fuel cell stack can have a structure in which the upstream section is disposed between the throttling section and the downstream section. That is, the upstream section is disposed at the center, and the throttling section and the downstream section are disposed around the upstream section. In this case, the upstream section (central section) of the fuel cell stack is likely to have a high temperature through reception of Joule heat from surrounding fuel cells (including the throttling section and the downstream section). By contrast, the fuel cells (including the throttling section and the downstream section) around the upstream section (central section) are likely to drop in temperature as a result of heat radiation. Also, while fuel gas having a low temperature is introduced into the upstream section, the throttling section and the downstream section increase in fuel gas temperature as a result of reception of Joule heat of the upstream section.

That is, through disposition of the upstream section, which is less prone to increase in temperature, at the center of the fuel cell stack, and disposition of the throttling section and the downstream section around the upstream section, temperature distribution among the fuel cells can approach homogeneous distribution. As a result, power generation efficiency can be improved.

Preferably, a relational expression $N2/(N1+N2) \leq 0.58$ is satisfied, where N1 is the first number, and N2 is the second number. Through specification of "$N2/(N1+N2) \leq 0.58$," each of the first and second blocks can be operated at a fuel utilization rate lower than a nominal fuel utilization rate, so that a high output can be produced. In the case of "$N2/(N1+N2) > 0.58$," for example, if the fuel utilization rate in the entire fuel cell stack (overall fuel utilization rate) is 80%, the fuel utilization rate in the second block becomes 70% or higher. In this case, the difference between the fuel utilization rate in the second block and the overall fuel utilization rate is small, so that characteristic superiority is not obtained.

Preferably, a relational expression $N2/(N1+N2) \geq 0.13$ is satisfied, where N1 is the first number, and N2 is the second number. Through specification of "$N2/(N1+N2) \geq 0.13$," each of the first and second blocks can be operated at a fuel utilization rate lower than a nominal fuel utilization rate, so that a high output can be produced. In the case of "$N2/(N1+N2) < 0.13$," for example, if the fuel utilization rate in the entire fuel cell stack (overall fuel utilization rate) is 80%, the fuel utilization rate in the second block becomes 70% or higher. In this case, the difference between the fuel utilization rate in the second block and the overall fuel utilization rate is small, so that characteristic superiority is not obtained.

Preferably, the first block is disposed between the second block and the throttling section and is in thermally conductive contact with the second block and the throttling section. An intermediate section of the solid oxide fuel cell stack is likely to have a high temperature through reception of Joule heat from a surrounding section. By contrast, opposite end sections of the stack are likely to be lower in temperature than the intermediate section. Furthermore, while gas having a low temperature is introduced into the first block, the second block and the throttling section increase in gas temperature as a result of reception of Joule heat of the first block. Therefore, through disposition of the first block, which is less prone to increase in temperature, at a central section of the stack, and disposition of the second block and the throttling section around the first block, temperature distribution of the stack can approach homogeneous distribution.

The cells may be each in the form of a flat plate, and each of the first block and the second block may be a stack of the cells stacked along a cell thickness direction. Through employment of a stack structure, the fuel cell stack can become compact.

In this case, preferably, the throttling section has an outline corresponding to a planar outline of the cells and is stacked together with the cells along the stacking direction. Since the fuel cell stack can have a stack structure which encompasses the throttling section, the fuel cell stack can become compact.

The fuel cell stack may further comprise a first oxidizer supply channel having a first oxidizer gas trunk channel and third branch channels branching off from the first oxidizer gas trunk channel, and adapted to parallelly supply the cells of the first and second blocks with oxidizer gas, and an oxidizer gas discharge channel for discharging the oxidizer gas which has passed through the cells of the first and second blocks, from the first and second blocks to an external section. Oxidizer gas can be parallelly supplied to the cells. By virtue of this, pressure loss is reduced, whereby supply of oxidizer gas is facilitated. For example, in the case of supply of oxidizer gas at a high flow rate, pressure loss increases, potentially resulting in increase in electric power consumption for supply of oxidizer gas (for example, increase in electric power consumption of an air pump). Even in such a case, through parallel supply of oxidizer gas, pressure loss is reduced, whereby electric power consumption can be reduced.

The fuel cell stack may further comprise a first oxidizer supply channel having a first oxidizer gas trunk channel and third branch channels branching off from the first oxidizer gas trunk channel, and adapted to parallelly supply the cells of the first block with oxidizer gas; a second collecting channel for collecting the oxidizer gas which has passed through the cells of the first block; a second oxidizer supply channel having a second oxidizer gas trunk channel and fourth branch channels branching off from the second oxidizer gas trunk channel, and adapted to parallelly supply the cells of the second block with the oxidizer gas which has passed through the cells of the first block and has been collected into the second collecting channel; and a second discharge channel for discharging the oxidizer gas which has passed through the cells of the second block, from the second block to an external section; the first oxidizer supply channel, the first block, the second collecting channel, the second oxidizer supply channel, the second block, and the second discharge channel being arranged sequentially from an upstream side along a direction of flow of the oxidizer gas; wherein a second throttling section capable of throttling the oxidizer gas and smaller in channel diameter than the first and second oxidizer gas trunk channels, the third and fourth branch channels, the second collecting channel, and the second discharge channel may be provided at a position located downstream of the second collecting channel and upstream of the second oxidizer supply channel.

By virtue of the number of cells of the first block being larger than the number of cells of the second block, oxidizer gas which has not been consumed in the first block is consumed in the second block, whereby oxidizer gas can be effectively utilized. Also, since the second throttling section is smaller in channel diameter than the first and second oxidizer gas trunk channels, the third and fourth branch channels, the second collecting channel, and the second discharge channel and thus throttles oxidizer gas, the flow of oxidizer gas within the first block becomes uniform, so that distribution of oxidizer gas to the cells of the first block becomes uniform. Through flow of oxidizer gas in the order of the first oxidizer supply channel (the first oxidizer gas trunk channel and the third branch channels), the first block, the second collecting channel, the second throttling section, the second oxidizer supply channel (the second oxidizer gas trunk channel and the third branch channels), and the second block, pressure loss of oxidizer gas within the fuel cell stack can be reduced.

Herein, in addition to fuel gas, oxidizer gas is throttled. Restrictions corresponding to those on fuel gas may be added (restrictions on fuel gas are added as those on oxidizer gas). Since the flow rate of air supplied to the cells of the first block increases, cooling effect is enhanced. Since air which has drawn heat from the first block is supplied to stack opposite end sections (the throttling section and the second block) which are likely to drop in temperature, temperature distribution can approach homogeneous distribution.

Effects of the Invention

The present invention can provide a fuel cell stack having uniform fuel distribution and improved fuel utilization rate.

MODES FOR CARRYING OUT THE INVENTION

Embodiments to which the present invention is applied will next be described with reference to the drawings. The present invention is not limited to the following embodiments, but may be embodied in various forms without departing from the technological scope of the present invention.

First Embodiment

Figure 1:
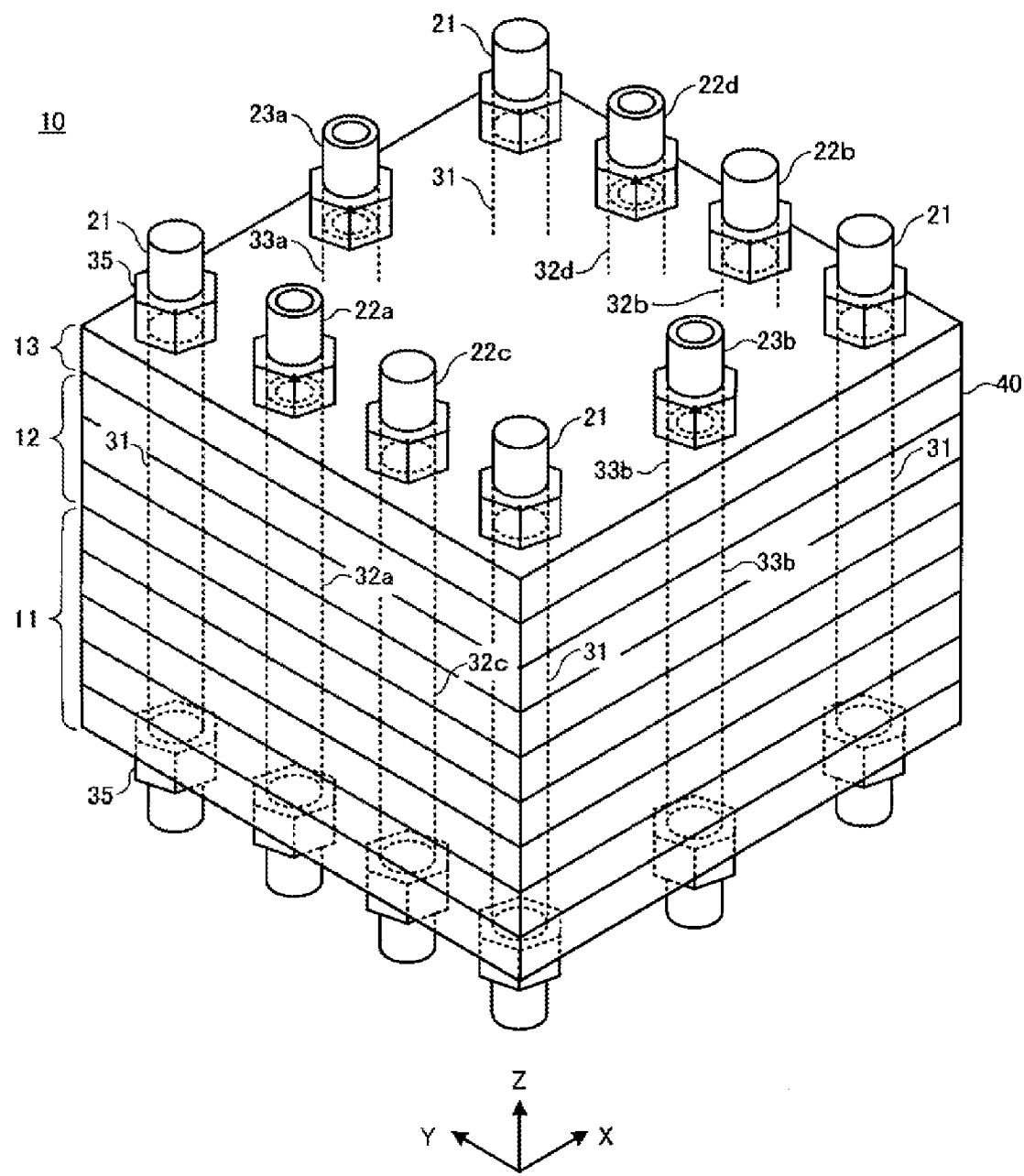
FIG. 1 Perspective view showing a fuel cell stack 10 according to a first embodiment of the present invention.

FIG. 1 is a perspective view showing a solid oxide fuel cell stack 10 according to a first embodiment of the present invention. The solid oxide fuel cell stack 10 is an apparatus for generating electricity by use of fuel gas (e.g., hydrogen) and oxidizer gas (e.g., air (more specifically oxygen contained in air)) supplied thereto and has a first block 11, a second block 12, and a throttling section 13.

The first block 11, the second block 12, and the throttling section 13 are sequentially stacked and are fixed together with bolts 21, 22 (22a to 22d), and 23 (23a and 23b) and nuts 35. Thus, the first block 11, the second block 12, and the throttling section 13 have through holes 31, 32 (32a to 32d), and 33 (33a and 33b) corresponding to the bolts 21, 22 (22a to 22d), and 23 (23a and 23b), respectively.

A first number N1 of fuel cells 40 and a second number N2 of fuel cells 40 are stacked in the first block 11 and the second block 12, respectively, and are connected electrically in series. The second number N2 is smaller than the first number N1. The second block 12 utilizes fuel gas, etc., which have been unused in the first block 11, for improving overall fuel utilization rate, etc.

The throttling section 13 is smaller in channel diameter than fuel gas channels 24a and 24c (first and second fuel gas trunk channels), fuel gas outlets 27a and 27c (first and second branch channels), fuel gas inlets 26b and a fuel gas channel 24b (collecting channel), and fuel gas inlets 26d and a fuel gas channel 24d (discharge channel), which will be described later, and can throttle fuel gas (see FIG. 4).

That is, the effective cross-sectional area of channel of the throttling section 13 is smaller than any of the following:
cross-sectional area of channel of the fuel gas channels 24a and 24c (first and second fuel gas trunk channels);
cross-sectional area of channel of the fuel gas outlets 27a and 27c (first and second branch channels);
cross-sectional area of channel of the fuel gas inlets 26b and the fuel gas channel 24b (collecting channel); and
cross-sectional area of channel of the fuel gas inlets 26d and the fuel gas channel 24d (discharge channel).

In this connection, usually, a plurality of the fuel gas outlets 27a or 27c or a plurality of the fuel gas inlets 26b or 26d are provided in a certain fuel cell 40. In this case, the total of cross-sectional areas of a plurality of channels (fuel gas outlets 27a or 27c or fuel gas inlets 26b or 26d) in the fuel cell 40 is the cross-sectional area of channel of the fuel cell 40 as a whole.

The effective cross-sectional area of channel of the throttling section 13 is the cross-sectional area of channel of the throttling section 13 with the cross-sectional area of channel of a fuel gas outlet 27b, through which fuel gas flows into the throttling section 13, and that of a fuel gas inlet 26c, through which fuel gas flows out from the throttling section 13, taken into consideration. The structure of the throttling section 13 will be described in detail later.

Figure 2:
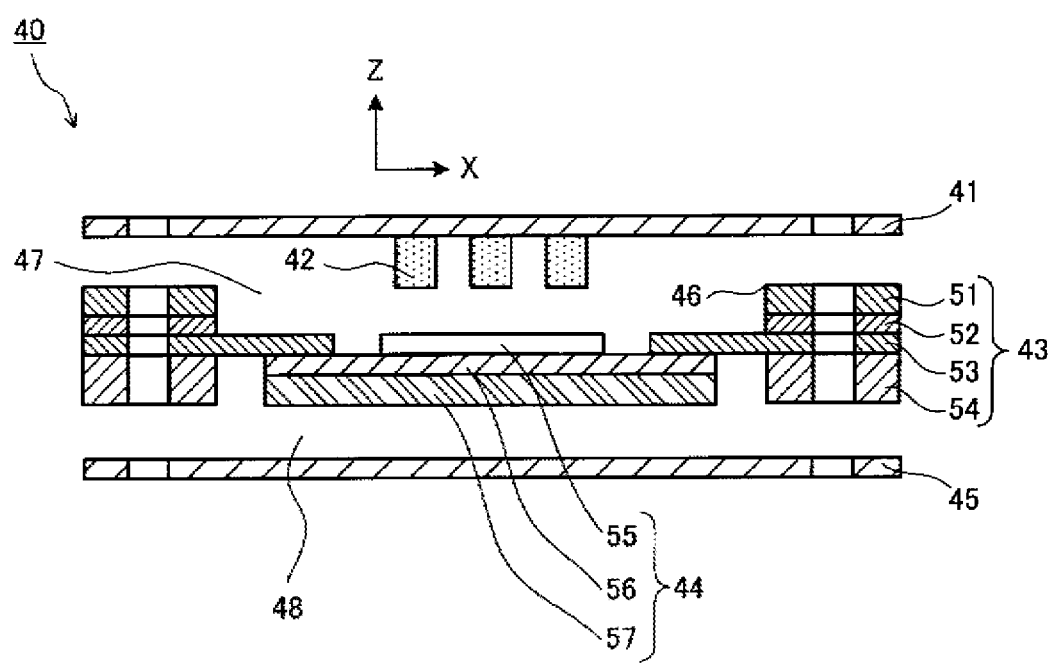
FIG. 2 Side view showing a fuel cell 40.
Figure 3:
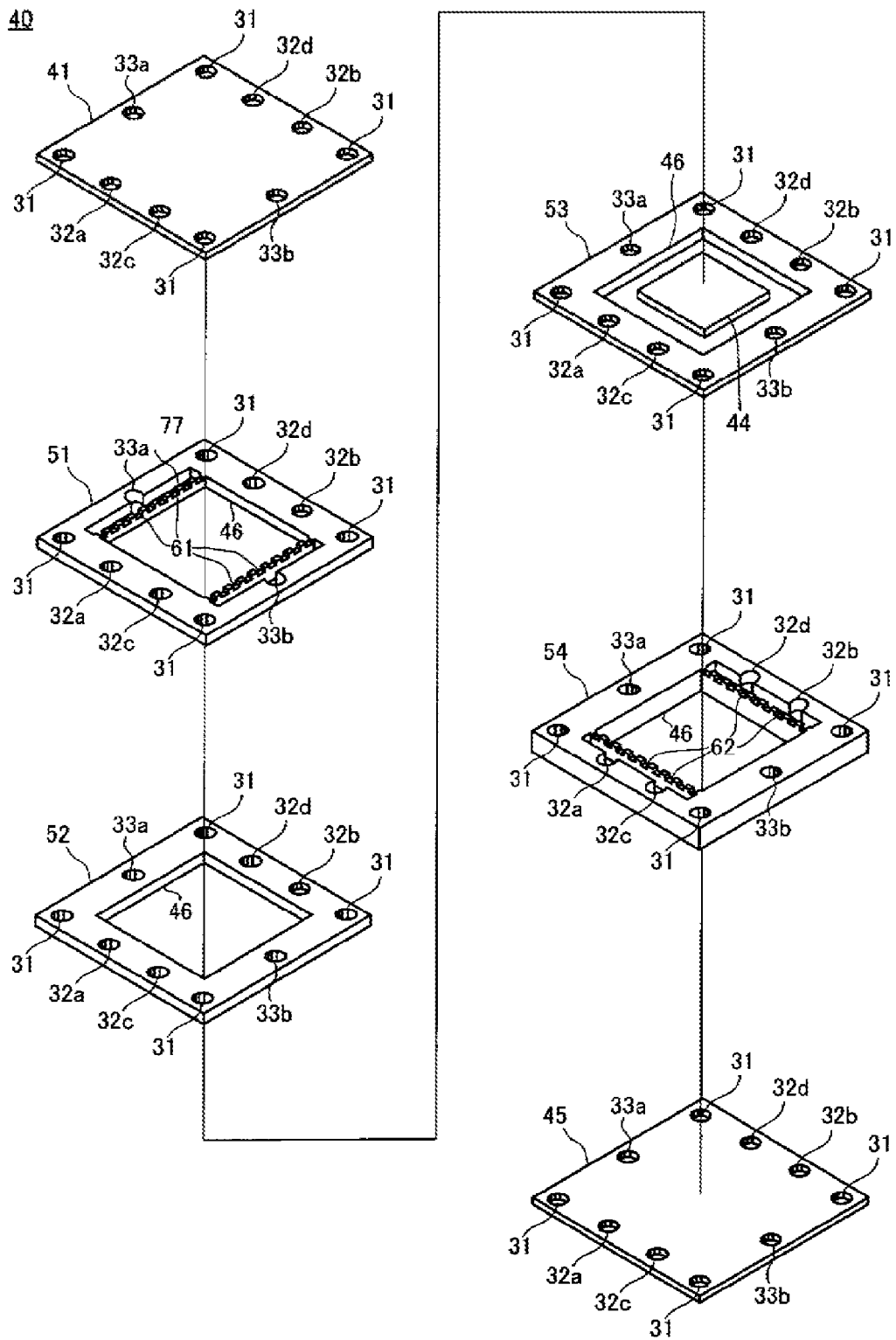
FIG. 3 Perspective view showing the fuel cell 40.

FIGS. 2 and 3 are a side view and a perspective view, respectively, of the fuel cell 40. As shown in FIG. 2, the fuel cell 40 is a so-called anode-support-membrane-type fuel cell and has interconnectors 41 and 45, a current collector 42, a frame section 43, and a cell body 44.

The interconnectors 41 and 45 are a pair consisting of upper and lower electrically conductive (e.g., metal) plates for ensuring electrical conduction between the fuel cells 40 and separating gas channels from each other. Only a single interconnector is disposed between the fuel cells 40 (sharing of interconnector).

The current collector 42 ensures electrical conduction between the cell body 44 (cathode 55) and the interconnector 41 and is formed of a metal material such as SUS (stainless steel).

The frame section 43 has an opening 46. The interior of the opening 46 is airtightly maintained and is divided into an oxidizer gas channel 47 and a fuel gas channel 48. The frame section 43 has a cathode frame 51, an insulating frame 52, a separator (its outer peripheral portion) 53, and an anode frame 54. The cathode frame 51 is a metal frame disposed on a side toward the oxidizer gas channel 47. The insulating frame 52 is a ceramic frame for electrically insulating the interconnectors 41 and 45 from each other. The separator 53 is a metal frame to which the cell body 44 is joined and which separates the oxidizer gas channel 47 and the fuel gas channel 48 from each other. The anode frame 54 is a metal frame disposed on a side toward the fuel gas channel 48.

The frame section 43 has through holes 31, 32 (32a to 32d), and 33 (33a and 33b) corresponding to the bolts 21, 22 (22a to 22d), and 23 (23a and 23b), respectively.

The cell body 44 is a laminate of the cathode 55, a solid electrolyte 56, and an anode 57. The cathode 55 and the anode 57 are disposed on the solid electrolyte 56 on a side toward the oxidizer gas channel 47 and on a side toward the fuel gas channel 48, respectively. Perovskite-type oxides, noble metals, and cermets of noble metals and ceramic can be used to form the cathode 55. YSZ, Sc, SZ, SDC, GDC, perovskite-type oxides, and like materials can be used to form the solid electrolyte 56. Ni and a cermet of Ni and ceramic can be used to form the anode 57.

As shown in FIG. 3, in the cathode frame 51, the through holes 33 (33a and 33b) and the opening 46 are spacially connected through cuts 61, thereby enabling flow of oxidizer gas therebetween. In the anode frame 54, the through holes 32 (32a to 33d) and the opening 46 are spacially connected through cuts 62, thereby enabling flow of fuel gas therebetween.

Figure 4:
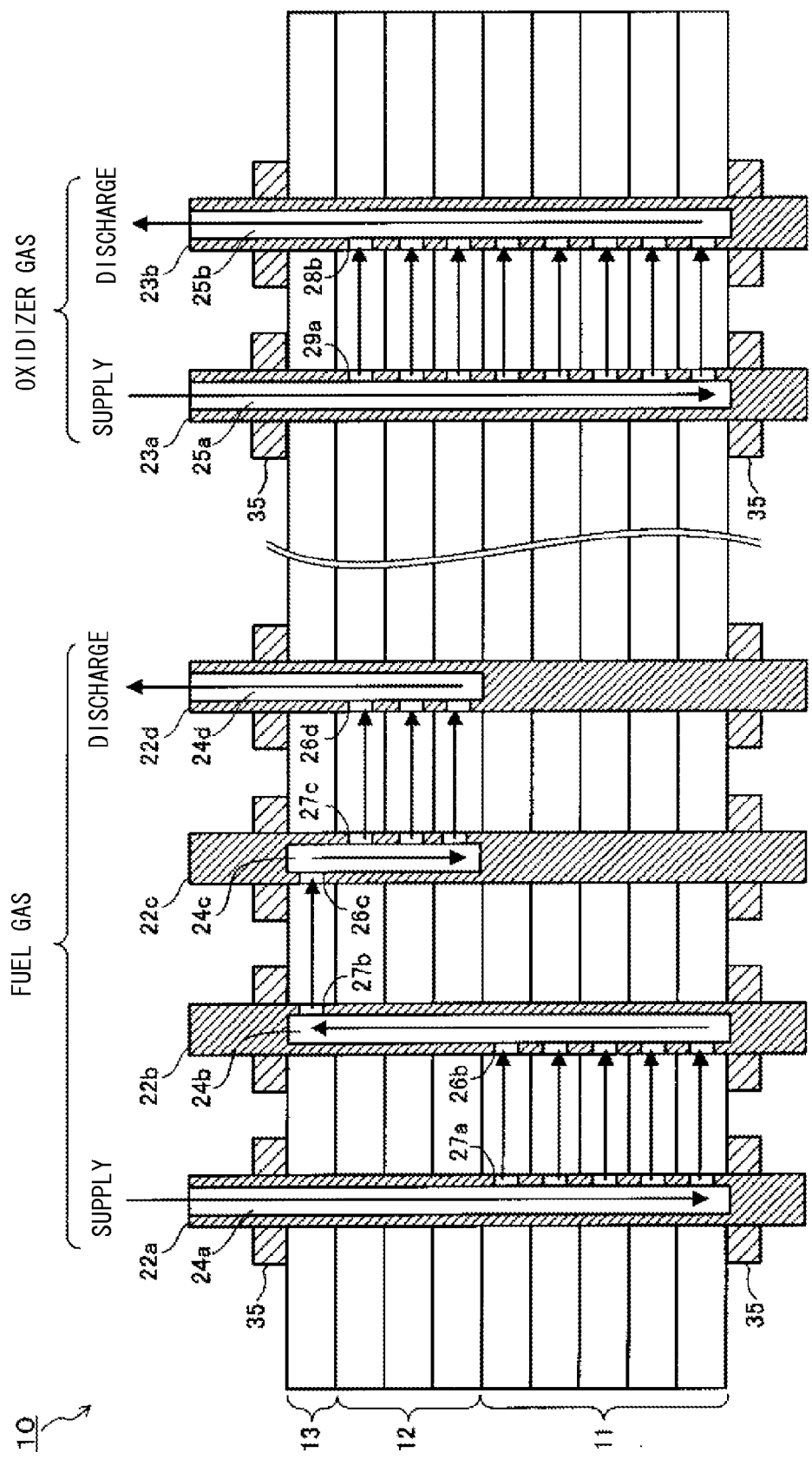
FIG. 4 Schematic view showing the interior of the fuel cell stack 10.

FIG. 4 is a schematic view showing the section of the solid oxide fuel cell stack 10. As shown in FIG. 4, fuel gas flows into the openings 46 (fuel gas channels 48) of the anode frames 54 from the through holes 32 (32a to 32d) and flows out from the openings 46 into the through holes 32 (32a to 32d) through the fuel gas inlets 26 (26b to 26d) and the fuel gas outlets 27 (27a to 27c), respectively, of the fuel gas channels 24 (24a to 24d) extending through the bolts 22 (22a to 22d). Oxidizer gas flows into the openings 46 (oxidizer gas channels 47) of the cathode frames 51 from the through holes 33 (33a and 33b) and flows out from the openings 46 into the through holes 33 (33a and 33b) through oxidizer gas inlets 28 (28b) and oxidizer gas outlets 29 (29a), respectively, of oxidizer gas channels 25 (25a and 25b) extending through the bolts 23 (23a and 23b).

In the first block 11 and the second block 12, the cathode frame 51 and the anode frame 54 can be identical to each other. By contrast, in the first block 11 and the second block 12, the cathode frame 51 and the anode frame 54 can differ from each other. That is, the arrangement of the fuel gas inlets 26 (26b to 26d), the fuel gas outlets 27 (27a to 27c), the oxidizer gas inlets 28 (28a, 28b), and the oxidizer gas outlets 29 (29a, 29b) corresponds to the arrangement of the cuts 61 and 62. Through employment of such arrangement, airtightness in the openings 46 can be further ensured.

As shown in FIG. 4, in the present embodiment, fuel gas flows in the order of the first block 11, the throttling section 13, and the second block 12. Oxidizer gas is parallelly supplied to the first block 11, the throttling section 13, and the second block 12.

That is, the fuel gas inlets 26 (26b to 26d), the fuel gas outlets 27 (27a to 27c), the oxidizer gas inlets 28 (28a and 28b), and the oxidizer gas outlets 29 (29a and 29b) are arranged in such a manner as to correspond to the first block 11, the second block 12, and the throttling section 13. As a result, there can be specified the order of the first block 11, the second block 12, and the throttling section 13 in which fuel gas and oxidizer gas flow.

The bolts 21 are members for pressing and fixing a stack of the first block 11, the second block 12, and the throttling section 13.

The bolts 22 (22a to 22d) are members for allowing fuel gas to flow and have the fuel gas channels 24 (24a to 24d), respectively, through which fuel gas flows. The bolts 23 (23a and 23b) are members for allowing oxidizer gas to flow and have the oxidizer gas channels 25 (25a and 25b), respectively, through which oxidizer gas flows. The fuel gas channels 24 and the oxidizer gas channels 25 are hollow holes provided in the bolts 22 and 23, respectively.

The bolts 22 (22a to 22d) have the fuel gas inlets 26 (26b to 26d) and the fuel gas outlets 27 (27a to 27c) connected to the fuel gas channels 24 (24a to 24d). The fuel gas inlets 26 (26b to 26d) and the fuel gas outlets 27 (27a to 27c) allow fuel gas to flow into and out from the fuel gas channels 24 (24a to 24d) therethrough. The bolts 23 (23a and 23b) have the oxidizer gas inlets 28 (28a and 28b) and the oxidizer gas outlets 29 (29a and 29b) connected to the oxidizer gas channels 25 (25a and 25b). The oxidizer gas inlets 28 (28a and 28b) and the oxidizer gas outlets 29 (29a and 29b) allow oxidizer gas to flow into and out from the oxidizer gas channels 25 (25a and 25b). The fuel gas inlets 26, the fuel gas outlets 27, the oxidizer gas inlets 28, and the oxidizer gas outlets 29 are through holes formed in side walls of the bolts 22 and 23 for establishing communication with the fuel gas channels 24 and the oxidizer gas channels 25, respectively.

The bolt 22a has the fuel gas channel 24a and the fuel gas outlets 27a. Fuel gas flows into the fuel gas channel 24a from an external section and parallelly flows out to the fuel cells 40 of the first block 11 from the fuel gas outlets 27a (and the cuts 62). The fuel gas channel 24a and the fuel gas outlets 27a function as a first fuel gas trunk channel and first branch channels, respectively.

The bolt 22b has the fuel gas channel 24b, the fuel gas inlets 26b, and the fuel gas outlets 27b. Fuel gas parallelly flows into the fuel gas channel 24b from the fuel cells 40 of the first block 11 through the fuel gas inlets 26b (and the cuts 62) and flows out to the throttling section 13 from the fuel gas outlet 27b (and the cuts 62). The fuel gas inlets 26b and the fuel gas channel 24b collectively function as a collecting channel for collecting fuel gas which has passed through the fuel cells 40 of the first block 11.

The bolt 22c has the fuel gas channel 24c, the fuel gas inlet 26c, and the fuel gas outlets 27c. Fuel gas flows into the fuel gas channel 24c from the throttling section 13 through the fuel gas inlet 26c (and the cuts 62) and parallelly flows out to the fuel cells 40 of the second block 12 from the fuel gas outlets 27c (and the cuts 62). The fuel gas channel 24c and the fuel gas outlets 27c function as a second fuel gas trunk channel and second branch channels, respectively.

The bolt 22d has the fuel gas channel 24d and the fuel gas inlets 26d. Fuel gas parallelly flows into the fuel gas channel 24d from the fuel cells 40 of the second block 12 through the fuel gas inlets 26d (and the cuts 61) and flows out to an external section. The fuel gas inlets 26d and the fuel gas channel 24d collectively function as a discharge channel for discharging, to an external section, fuel gas which has passed through the fuel cells 40 of the second block 12.

The bolt 23a has the oxidizer gas channel 25a and the oxidizer gas outlets 29a. Oxidizer gas flows into the oxidizer gas channel 25a from an external section and parallelly flows out to the fuel cells 40 of the first and second blocks 11 and 12 from the oxidizer gas outlets 29a (and the cuts 61). The oxidizer gas channel 25a and the oxidizer gas outlets 29a function as a first oxidizer gas trunk channel and third branch channels, respectively, which branch off from the first oxidizer gas trunk channel.

The bolt 23b has the oxidizer gas channel 25b and the oxidizer gas inlets 28b. Oxidizer gas parallelly flows into the fuel gas channel 24d from the fuel cells 40 of the first and second blocks 11 and 12 through the oxidizer gas inlets 28b (and the cuts 61) and flows out to an external section. The oxidizer gas channel 25b and the oxidizer gas inlets 28b collectively function as an oxidizer gas discharge channel for discharging, to an external section, oxidizer gas which has passed through the fuel cells 40 of the first and second blocks 11 and 12.

Figure 5A:
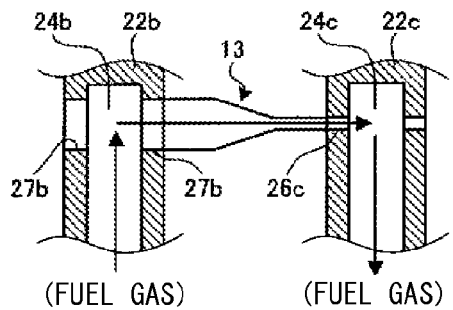
FIG. 5A Schematic sectional view showing an example of the throttling section 13.
Figure 5B:
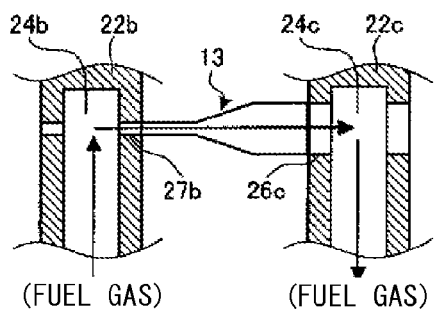
FIG. 5B Schematic sectional view showing another example of the throttling section 13.
Figure 5C:
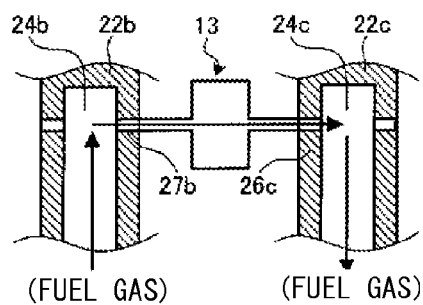
FIG. 5C Schematic sectional view showing a further example of the throttling section 13.
Figure 5D:
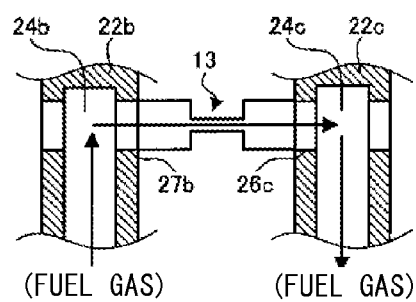
FIG. 5D Schematic sectional view showing a still further example of the throttling section 13.
Figure 6A:
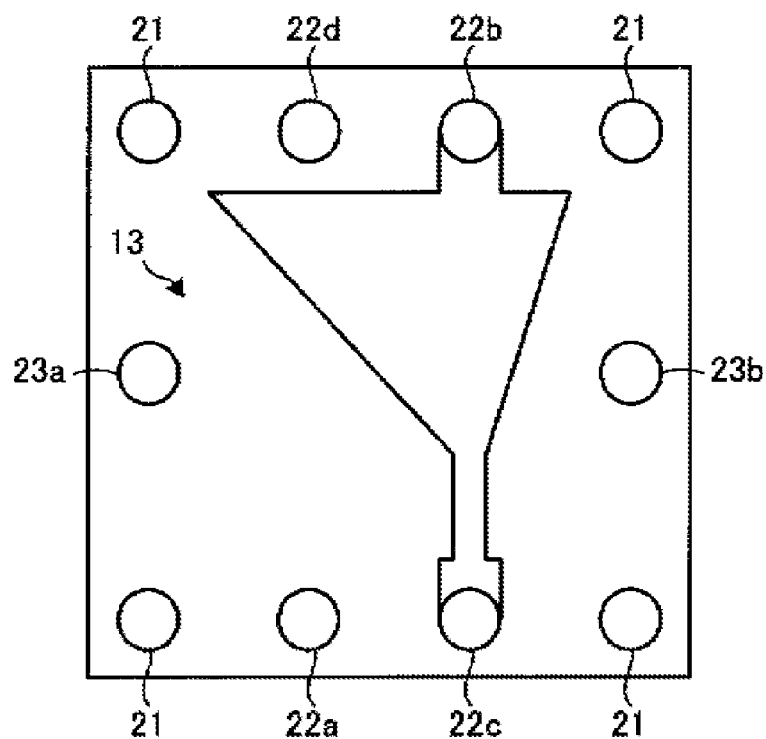
FIG. 6A Schematic plan view showing an example of the throttling section 13.
Figure 6B:
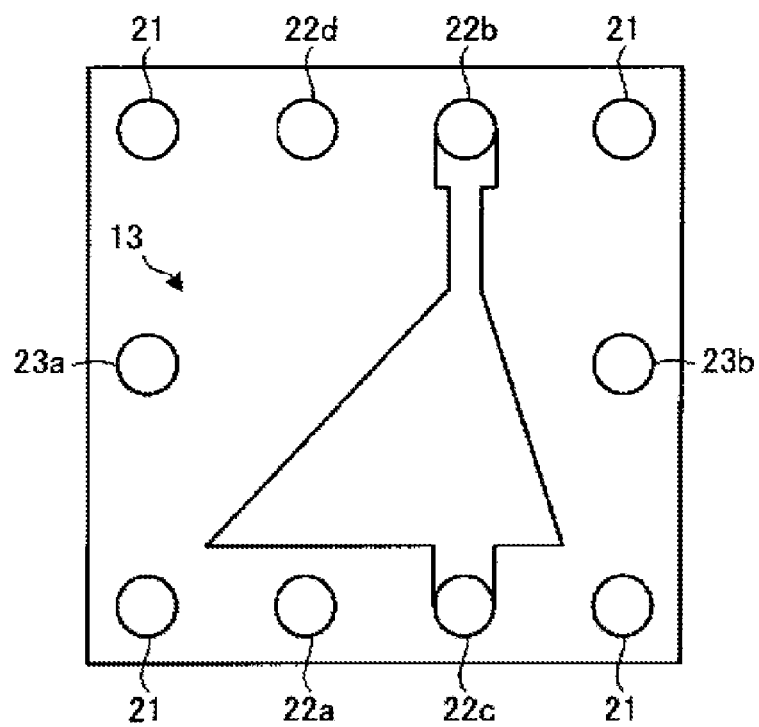
FIG. 6B Schematic plan view showing another example of the throttling section 13.
Figure 6C:
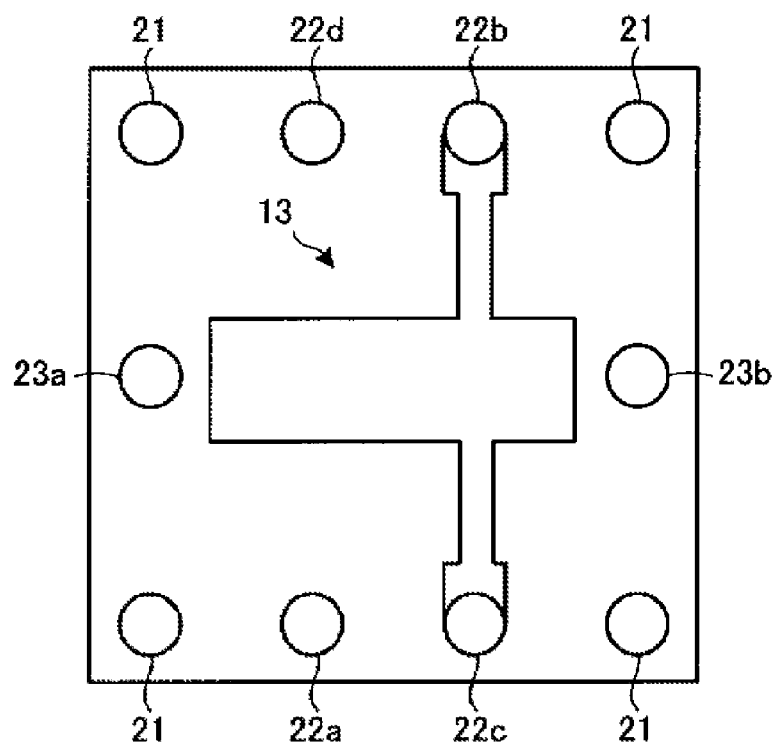
FIG. 6C Schematic plan view showing a further example of the throttling section 13.
Figure 6D:
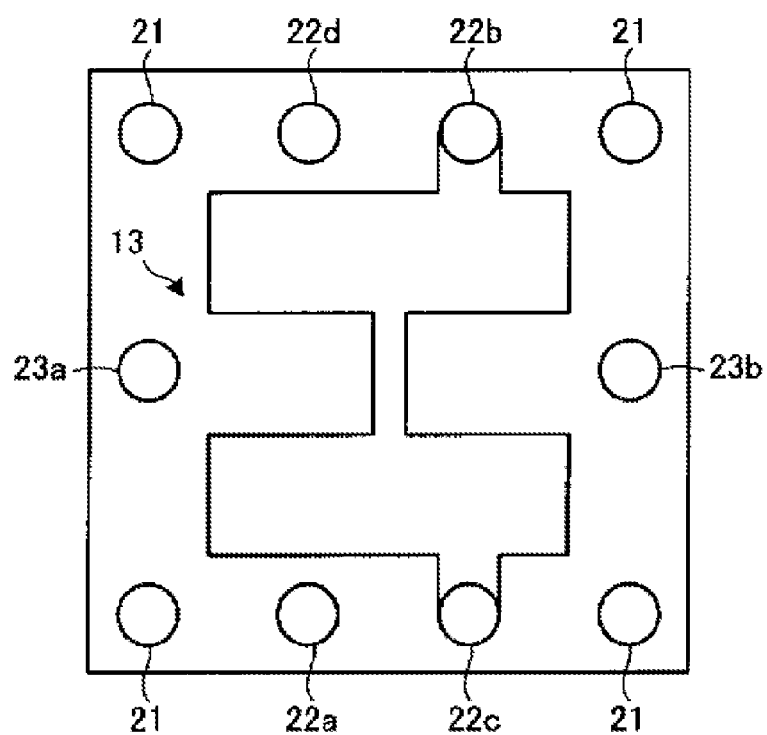
FIG. 6D Schematic plan view showing a still further example of the throttling section 13.

FIGS. 5A to 5D are schematic sectional views showing example cross sections of the throttling section 13. FIGS. 6A to 6D are schematic plan views showing example plans of the throttling section 13 corresponding to FIGS. 5A to 5D. In FIGS. 5A and 6A, the cross-sectional area of channel of the throttling section 13 is large at an inlet side of the throttling section 13 (on a side toward the fuel gas outlet 27b) and small at an outlet side (on a side toward the fuel gas inlet 26c). In FIGS. 5B and 6B, the cross-sectional area of channel of the throttling section 13 is small at the inlet side of the throttling section 13 (on the side toward the fuel gas outlet 27b) and large at the outlet side (on the side toward the fuel gas inlet 26c). In FIGS. 5C and 6C, the cross-sectional area of channel of the throttling section 13 is small at the inlet side of the throttling section 13 (on the side toward the fuel gas outlet 27b) and at the outlet side (on the side toward the fuel gas inlet 26c) and is large in an intermediate region therebetween. In FIGS. 5D and 6D, the cross-sectional area of channel of the throttling section 13 is large at the inlet side of the throttling section 13 (on the side toward the fuel gas outlet 27b) and at the outlet side (on the side toward the fuel gas inlet 26c) and is small in an intermediate region therebetween.

As shown in FIGS. 5A to 5D and 6A to 6D, the cross-sectional area of channel of the throttling section 13 reduces at least somewhere between the inlet side (the side toward the fuel gas outlet 27b) and the outlet side (the side toward the fuel gas inlet 26c). In this manner, a location where the cross-sectional area of channel is small functions as the throttling section 13 wherever it is located; specifically, only at the inlet side, only at the outlet side, at both of the inlet and outlet sides, or in an intermediate region.

Next, referring back to FIG. 4, flow of fuel gas in the present embodiment will be described. In the present embodiment, fuel gas flows in the following order of (1) to (6):

(1) fuel gas channel 24a (first fuel gas trunk channel) and fuel gas outlets 27a (first branch channels);

(2) first block 11;

(3) fuel gas inlets 26b and fuel gas channel 24b (collecting channel);

(4) fuel gas outlet 27b, throttling section 13, and fuel gas inlet 26c;

(5) fuel gas channel 24c (second fuel gas trunk channel) and fuel gas outlets 27c (second branch channels); and (6) fuel gas inlets 26d and fuel gas channel 24d (discharge channel).

By virtue of the number N1 of the fuel cells 40 of the first block 11 being larger than the number N2 of the fuel cells 40 of the second block 12, fuel gas which has not been consumed in the first block 11 is consumed in the second block 12, whereby fuel gas can be effectively utilized.

Also, the throttling section 13 is smaller in channel diameter than the fuel gas channels 24a and 24c (first and second fuel gas trunk channels), the fuel gas outlets 27a and 27c (first and second branch channels), the fuel gas inlets 26b and the fuel gas channel 24b (collecting channel), and the fuel gas inlets 26d and the fuel gas channel 24d (discharge channel) and thus throttles fuel gas. As a result, the flow of fuel gas within the first block 11 becomes uniform, so that distribution of fuel gas to the fuel cells 40 of the first block 11 becomes uniform.

Furthermore, fuel gas flows in the order of the first block 11, the throttling section 13, and the second block 12, whereby pressure loss of fuel gas within the solid oxide fuel cell stack 10 can be reduced.

In contrast to comparative example 1 (a solid oxide fuel cell stack 10x having no throttling section 13) and comparative example 2 (a solid oxide fuel cell stack 10y in which fuel gas flows in the order of the first block 11, the second block 12, and the throttling section 13), which will be described later, a good fuel utilization rate and uniform fuel distribution can be ensured.

(Modification 1)

Figure 7:
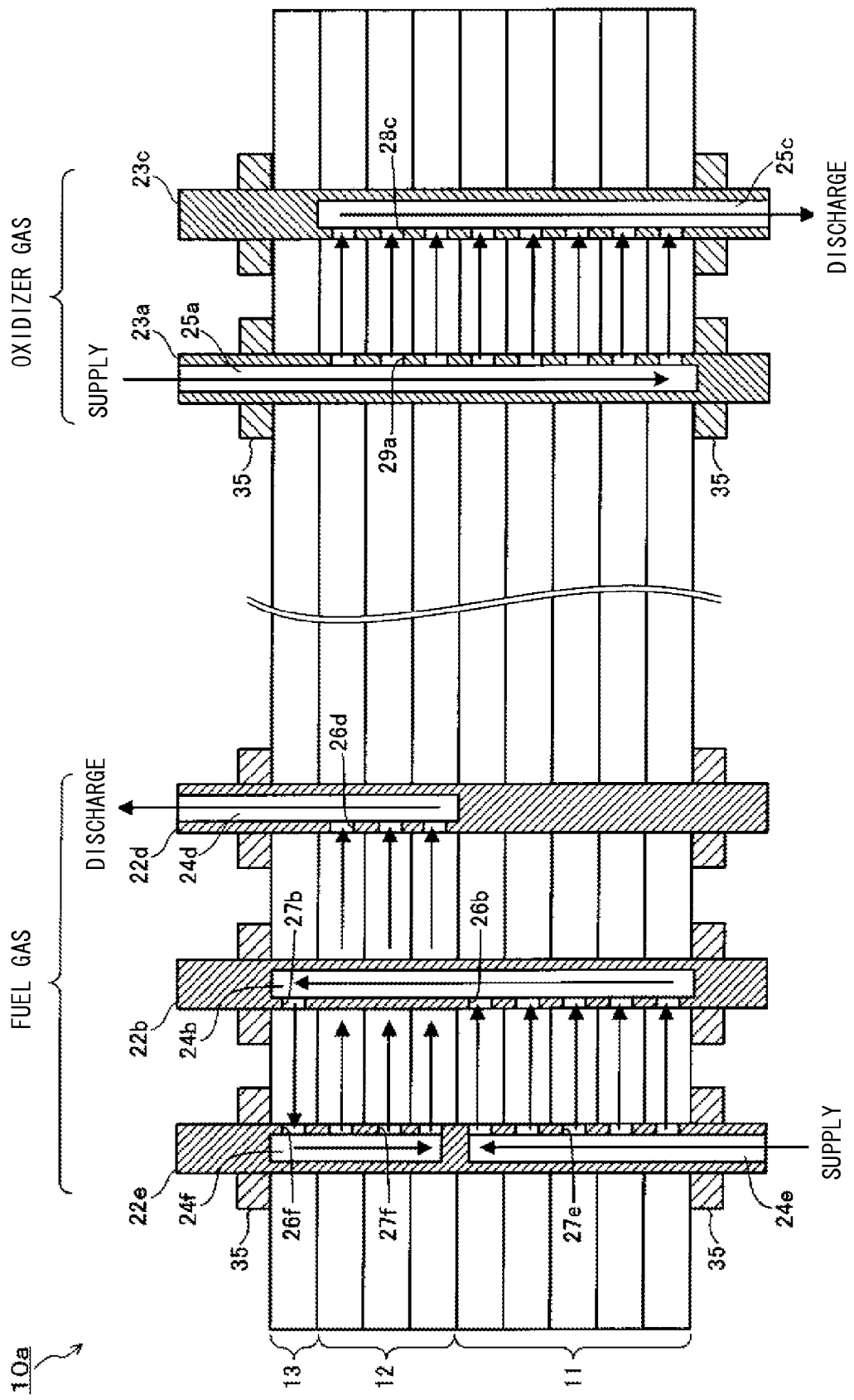
FIG. 7 Schematic view showing the interior of a fuel cell stack 10a according to modification of the first embodiment.

Modification 1 of the first embodiment will be described. FIG. 7 is a schematic view corresponding to FIG. 4 and showing a solid oxide fuel cell stack 10a according to modification 1 of the first embodiment. The solid oxide fuel cell stack 10a has the first block 11, the second block 12, the throttling section 13, and the bolts 22 (22e, 22b, and 22d) and 23 (23a and 23c). That is, the solid oxide fuel cell stack 10a has the bolt 22e in place of the bolts 22a and 22c and has the bolt 23c in place of the bolt 23b.

The bolt 22e has fuel gas channels 24e and 24f, a fuel gas inlet 26f, and fuel gas inlets 26e and 27f. Fuel gas flows into the fuel gas channel 24e from an external section and flows out to the first block 11 from the fuel gas outlets 27e (and the cuts 62). Fuel gas flows into the fuel gas channel 24f from the throttling section 13 through the fuel gas inlet 26f (and the cuts 62) and flows out to the second block 12 from the fuel gas outlets 27f (and the cuts 62). In this manner, through change of inflow direction of fuel gas, the bolt 22e enables inflow of fuel gas into the first block 11 from an external section and inflow and outflow of fuel gas from the throttling section 13 to the second block 12. As a result, the number of the bolts 22 can be reduced.

The bolt 23c has an oxidizer gas channel 25c and oxidizer gas inlets 28c. Oxidizer gas flows into the oxidizer gas channel 25c from the first block 11 and the second block 12 through the oxidizer gas inlets 28c (and the cuts 61) and flows out to an external section. This copes with a change of outflow direction of oxidizer gas.

In this manner, even though the blot 22e is used in place of the bolts 22a and 22c, similar to the first embodiment, a good fuel utilization rate and uniform fuel distribution can be ensured.

(Definitions of Fuel Utilization Rate and Power Generation Efficiency)

The definitions of fuel utilization rate and power generation efficiency will be described. Fuel utilization rate Uf [%] is the percentage of amount A1 of fuel used for generating electric power to amount A0 of supplied fuel and can be defined by the following Eq. (1).

$$Uf = A1/A0 * 100 \qquad \text{Eq. (1)}$$

A1: Amount of fuel used for generating electric power
A0: Amount of supplied fuel Power generation efficiency R [%] is the percentage of generated electric power P to combustion energy E possessed by supplied fuel and can be defined by the following Eq. (2).

$$R = P/E * 100 \qquad \text{Eq. (2)}$$

P: Electric power (output) (W) generated from fuel supplied per unit time
E: Combustion energy (W) possessed by fuel supplied per unit time When the fuel utilization rate Uf drops, a large amount of fuel is supplied as compared with a required amount of fuel for generating electric power, so that maintaining performance (output) of the fuel cell stack is facilitated. However, since fuel to be discharged without being used for generating electric power increases, the power generation efficiency R drops.

Second Embodiment

Figure 8:
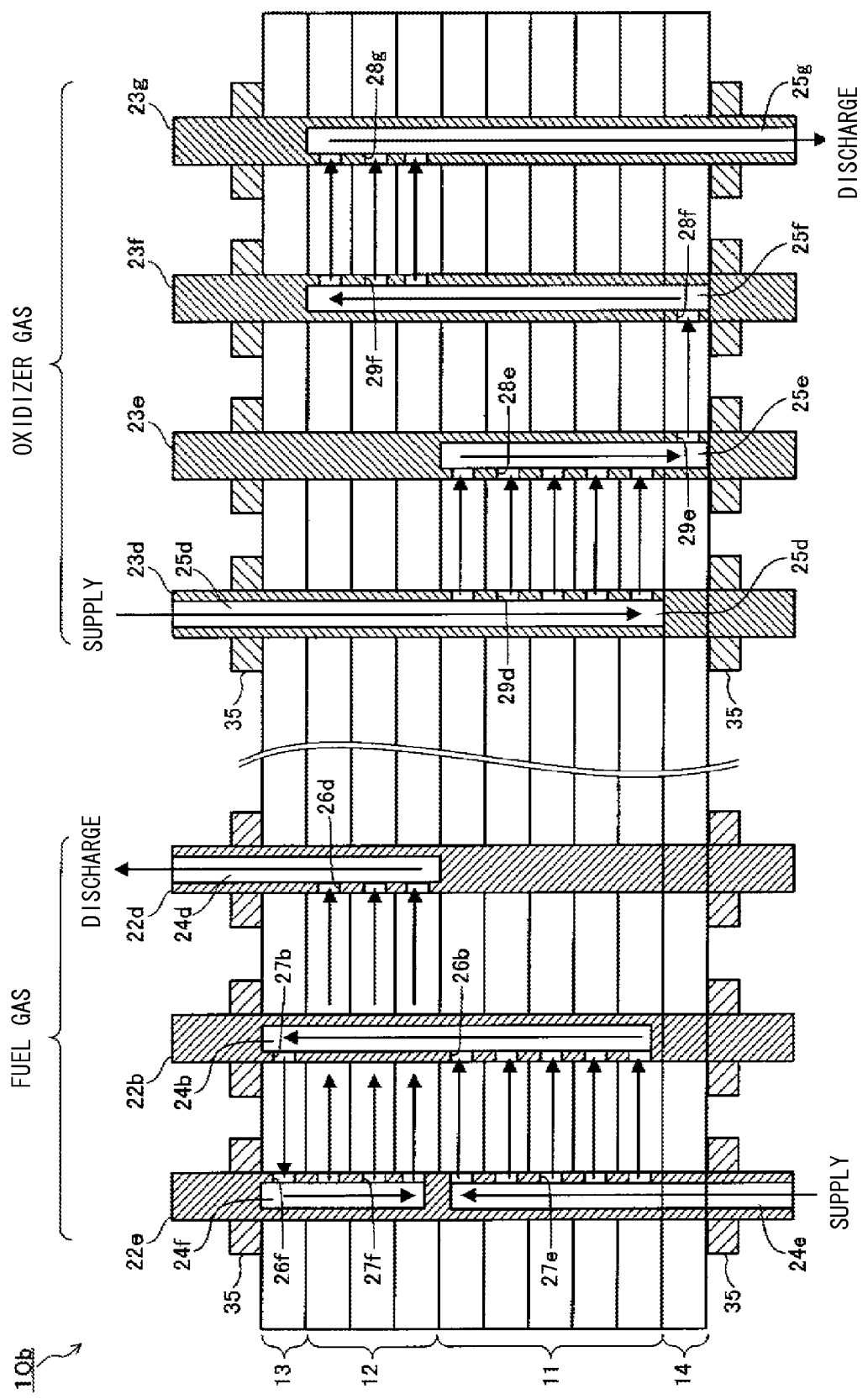
FIG. 8 Schematic view showing the interior of a fuel cell stack 10b according to a second embodiment.

A second embodiment will be described. FIG. 8 is a schematic view corresponding to FIG. 4 and showing a solid oxide fuel cell stack 10b according to the second embodiment. The solid oxide fuel cell stack 10b has the first block 11, the second block 12, the throttling sections 13 and 14, and the bolts 22 (22e, 22b, 22d) and 23 (23d to 23g). That is, in contrast to the foregoing modification, the present embodiment has an additional throttling section 14, and bolts 23d to 23g in place of the bolts 23c and 23b.

The throttling section 14 is smaller in channel diameter than oxidizer gas channels 25d and 25f (first and second oxidizer gas trunk channels), oxidizer gas outlets 29d and 29f (first and second branch channels), oxidizer gas inlets 28e and an oxidizer gas channel 25e (collecting channel), and oxidizer gas inlets 28g and an oxidizer gas channel 25g (discharge channel), and can throttle oxidizer gas.

That is, the effective cross-sectional area of channel of the throttling section 14 is smaller than any of the following:
cross-sectional area of channel of the oxidizer gas channels 25d and 25f (first and second oxidizer gas trunk channels);
cross-sectional area of channel of the oxidizer gas outlets 29d and 29f (first and second branch channels);
cross-sectional area of channel of the oxidizer gas inlets 28e and the oxidizer gas channel 25e (collecting channel); and
cross-sectional area of channel of the oxidizer gas inlets 28g and the oxidizer gas channel 25g (discharge channel).

In this connection, usually, a plurality of the oxidizer gas outlets 29d or 29f and a plurality of the oxidizer gas inlets 28e or 28g are provided; thus, the total of cross-sectional areas of the outlets and that of the inlets are the cross-sectional area of channel of the outlets and that of the inlets, respectively.

The effective cross-sectional area of channel of the throttling section 14 is the cross-sectional area of channel of the throttling section 14 with the cross-sectional area of channel of an oxidizer gas outlet 29e, through which oxidizer gas flows into the throttling section 14, and that of an oxidizer gas inlet 28f, through which oxidizer gas flows out from the throttling section 14, taken into consideration.

The bolt 23d has the oxidizer gas channel 25d and the oxidizer gas outlets 29d. Oxidizer gas flows into the oxidizer gas channel 25d from an external section and flows out to the first block 11 from the oxidizer gas outlets 29d (and the cuts 61). The oxidizer gas channel 25d and the oxidizer gas outlets 29d function as a first oxidizer gas trunk channel and first branch channels, respectively, which branch off from the first oxidizer gas trunk channel.

The bolt 23e has the oxidizer gas channel 25e, the oxidizer gas inlets 28e, and the oxidizer gas outlet 29e. Oxidizer gas flows into the oxidizer gas channel 25e from the first block 11 through the oxidizer gas inlets 28e (and the cuts 62) and flows out to the throttling section 14 from the oxidizer gas outlet 29e (and the cuts 61). The oxidizer gas inlets 28e and the oxidizer gas channel 25e collectively function as a collecting channel for collecting oxidizer gas which has passed through the fuel cells 40 of the first block 11.

The bolt 23f has the oxidizer gas channel 25f, the oxidizer gas inlet 28f, and the oxidizer gas outlets 29f. Oxidizer gas flows into the oxidizer gas channel 25f from the throttling section 13 through the oxidizer gas inlet 28f (and the cuts 61) and flows out to the second block 12 from the oxidizer gas outlets 29f (and the cuts 61). The oxidizer gas channel 25f and the oxidizer gas outlets 29f function as a second oxidizer gas trunk channel and second branch channels, respectively, which branch off from the second oxidizer gas trunk channel.

The bolt 23g has the oxidizer gas channel 25g and the oxidizer gas inlets 28g. Oxidizer gas flows into the oxidizer gas channel 25g from the second block 12 through the oxidizer gas inlets 28g (and the cuts 61) and flows out to an external section. The oxidizer gas inlets 28g and the oxidizer gas channel 25g collectively function as a discharge channel for discharging, to an external section, oxidizer gas which has passed through the fuel cells 40 of the second block 12.

In the present embodiment, oxidizer gas flows in the following order of (1) to (6):
(1) oxidizer gas channel 25d (first oxidizer gas trunk channel) and oxidizer gas outlets 29d (first branch channels);
(2) first block 11;
(3) oxidizer gas inlets 28e and oxidizer gas channel 25e (collecting channel);
(4) oxidizer gas outlet 29e, throttling section 14, oxidizer gas inlet 28f;
(5) oxidizer gas channel 25f (second oxidizer gas trunk channel) and oxidizer gas outlets 29f (second branch channels); and
(6) oxidizer gas inlets 28g and oxidizer gas channel 25g (discharge channel).

The throttling section 14 is smaller in channel diameter than the oxidizer gas channels 25d and 25f (first and second oxidizer gas trunk channels), the oxidizer gas outlets 29d and 29f (first and second branch channels), the oxidizer gas inlet 26b and the oxidizer gas channel 24b (collecting channel), and the oxidizer gas inlets 26d and the oxidizer gas channel 24d (discharge channel) and thus throttles oxidizer gas. As a result, the flow of oxidizer gas within the first block 11 becomes uniform, so that distribution of oxidizer gas to the fuel cells 40 of the first block 11 becomes uniform.

Furthermore, oxidizer gas flows in the order of the first block 11, the throttling section 14, and the second block 12, whereby pressure loss of oxidizer gas within the solid oxide fuel cell stack 10 can be reduced.

(Modification 2)

Figure 9:
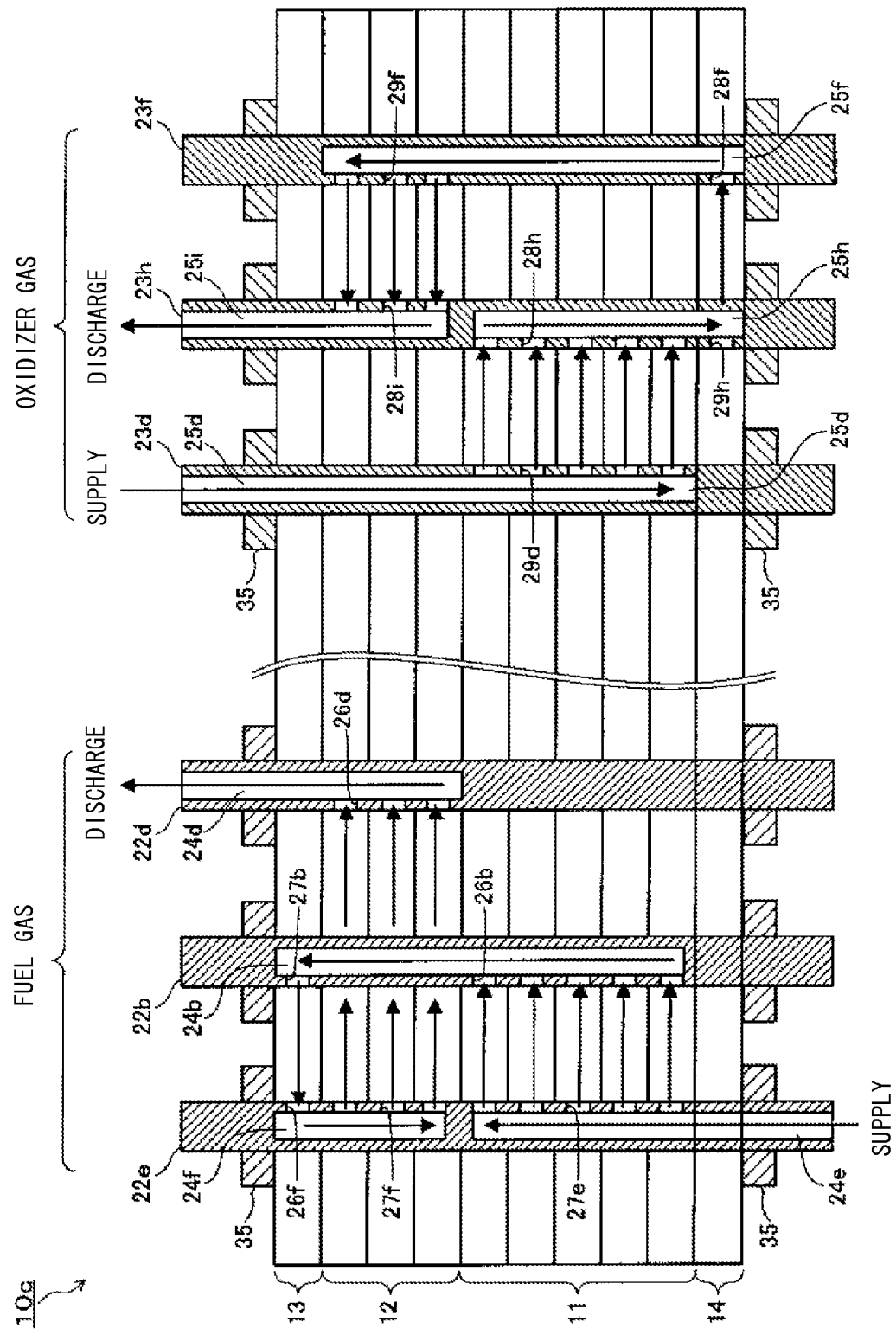
FIG. 9 Schematic view showing the interior of a fuel cell stack 10c according to modification of the second embodiment.

Modification 2 of the second embodiment will be described. FIG. 9 is a schematic view corresponding to FIG. 7 and showing a solid oxide fuel cell stack 10c according to modification 2 of the second embodiment. The solid oxide fuel cell stack 10c has the first block 11, the second block 12, the throttling sections 13 and 14, and the bolts 22 (22e, 22b, and 22d) and 23 (23d, 23h, and 23f). That is, the solid oxide fuel cell stack 10c has the bolt 22h in place of the bolts 23e and 23g.

The bolt 23h has oxidizer gas channels 25h and 25i and oxidizer gas inlets 28h and 28i and an oxidizer gas outlet 29h. Oxidizer gas flows into the oxidizer gas channel 25h from the first block 11 through the oxidizer gas inlets 28h (and the cuts 62) and flows out to the throttling section 14 from the oxidizer gas outlet 29h (and the cuts 61). Oxidizer gas flows into the oxidizer gas channel 25i from the second block 12 through the oxidizer gas inlets 28i (and the cuts 62) and flows out to an external section.

In this manner, through change of inflow direction of oxidizer gas, the bolt 23h enables inflow of oxidizer gas into the throttling section 14 from the first block 11 and outflow from the throttling section 14, and inflow and outflow of oxidizer gas to an external section from the second block 12. As a result, the number of the bolts 23 can be reduced.

In this manner, even though the blot 23h is used in place of the bolts 23e and 23g, similar to the second embodiment, a good fuel utilization rate and uniform fuel distribution can be ensured.

Third Embodiment

Figure 10:
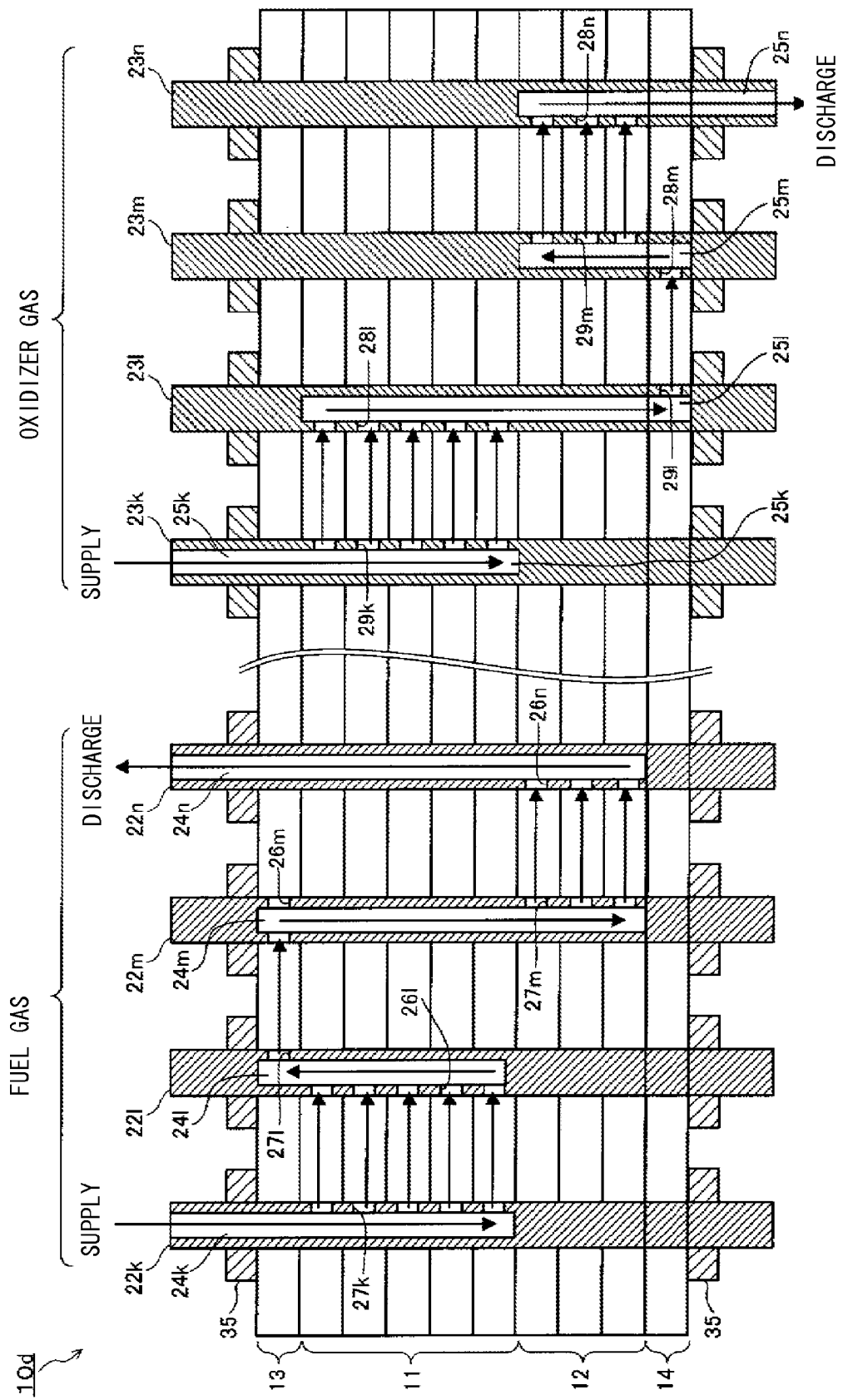
FIG. 10 Schematic view showing the interior of a fuel cell stack 10d according to a third embodiment.

A third embodiment will be described. FIG. 10 is a schematic view corresponding to FIG. 4 and showing a solid oxide fuel cell stack 10d according to the third embodiment. The solid oxide fuel cell stack 10d has the first block 11, the second block 12, the throttling sections 13 and 14, and the bolts 22 (22k to 22n) and 23 (23k to 23n). Similar to the second embodiment, fuel gas flows in the order of the first block 11, the throttling section 13, and the second block 12. Also, oxidizer gas flows in the order of the first block 11, the throttling section 14, and the second block 12. As a result, similar to the second embodiment, a good fuel utilization rate and uniform fuel distribution can be ensured.

In the solid oxide fuel cell stack 10d, the first block 11 is disposed between the second block 12 and the throttling section 13. As a result, temperature distribution of the solid oxide fuel cell stack 10d can approach homogeneous distribution.

A central section of the solid oxide fuel cell stack 10d is likely to have a high temperature through reception of Joule heat from a surrounding section. By contrast, an outer peripheral section of the solid oxide fuel cell stack 10d is likely to be lower in temperature than the central section as a result of heat radiation. Also, while gas having a low temperature is introduced into the first block 11, the second block 12 and the throttling section 13 increase in gas temperature as a result of reception of Joule heat of the first block 11. Therefore, through disposition of the first block 11, which is less prone to increase in temperature, at the center of the solid oxide fuel cell stack 10d, and disposition of the second block 12 and the throttling section 13 around the first block 11, temperature distribution of the solid oxide fuel cell stack 10d can approach homogeneous distribution.

Fourth Embodiment

Figure 11:
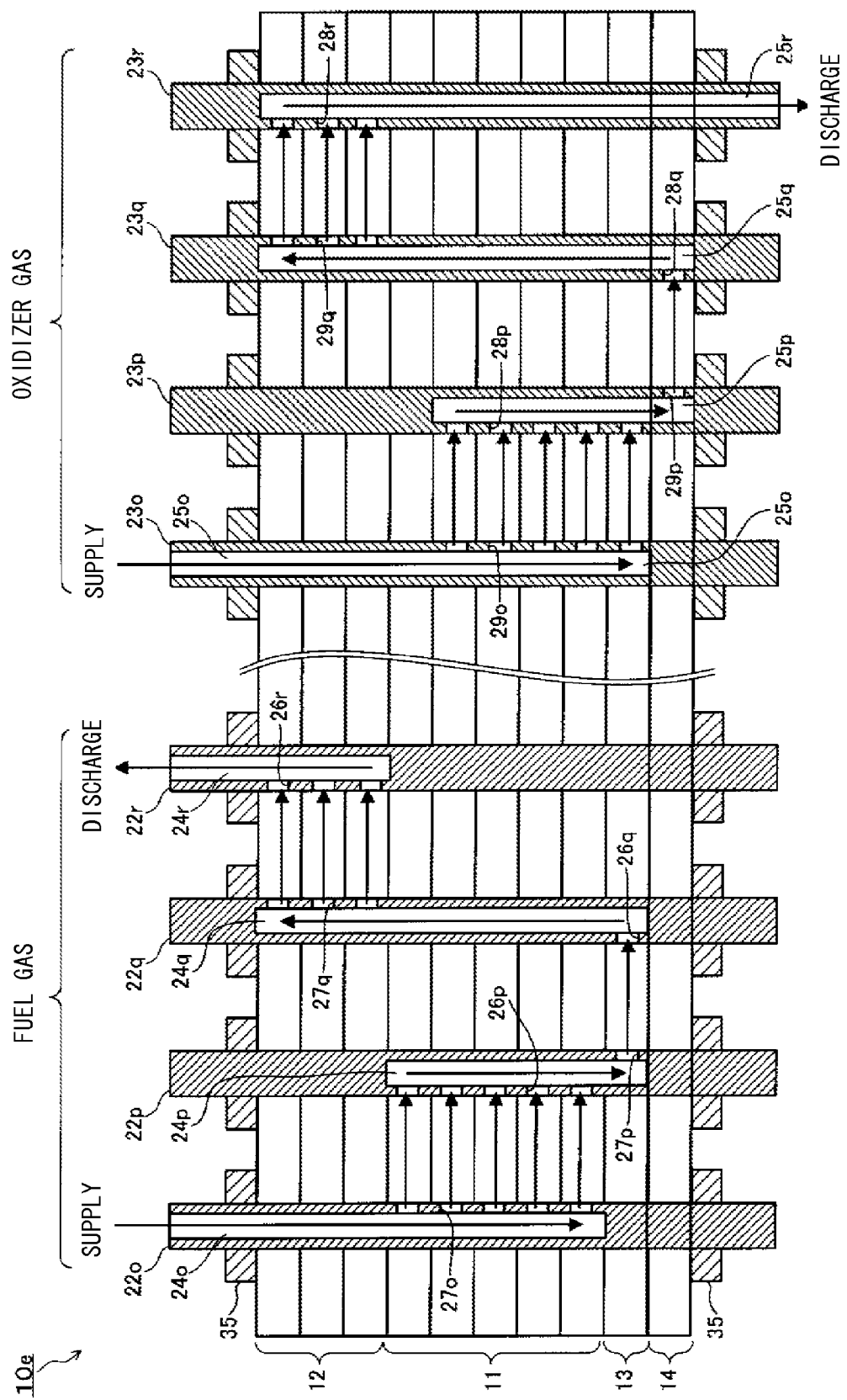
FIG. 11 Schematic view showing the interior of a fuel cell stack 10e according to a fourth embodiment.

A fourth embodiment will be described. FIG. 11 is a schematic view corresponding to FIG. 4 and showing a solid oxide fuel cell stack 10e according to the fourth embodiment. The solid oxide fuel cell stack 10e has the first block 11, the second block 12, the throttling sections 13 and 14, and the bolts 22 (22o to 22r) and 23 (23o to 23r).

In the solid oxide fuel cell stack 10e, the first block 11 is disposed between the second block 12 and the throttling section 13. As a result, temperature distribution of the solid oxide fuel cell stack 10e can approach homogeneous distribution. The positional relation between the second block 12 and the throttling section 13 is reversed with that of the third embodiment. In this manner, the positional relation between the second block 12 and the throttling section 13 may be vertically reversed.

Fifth Embodiment

Figure 12:
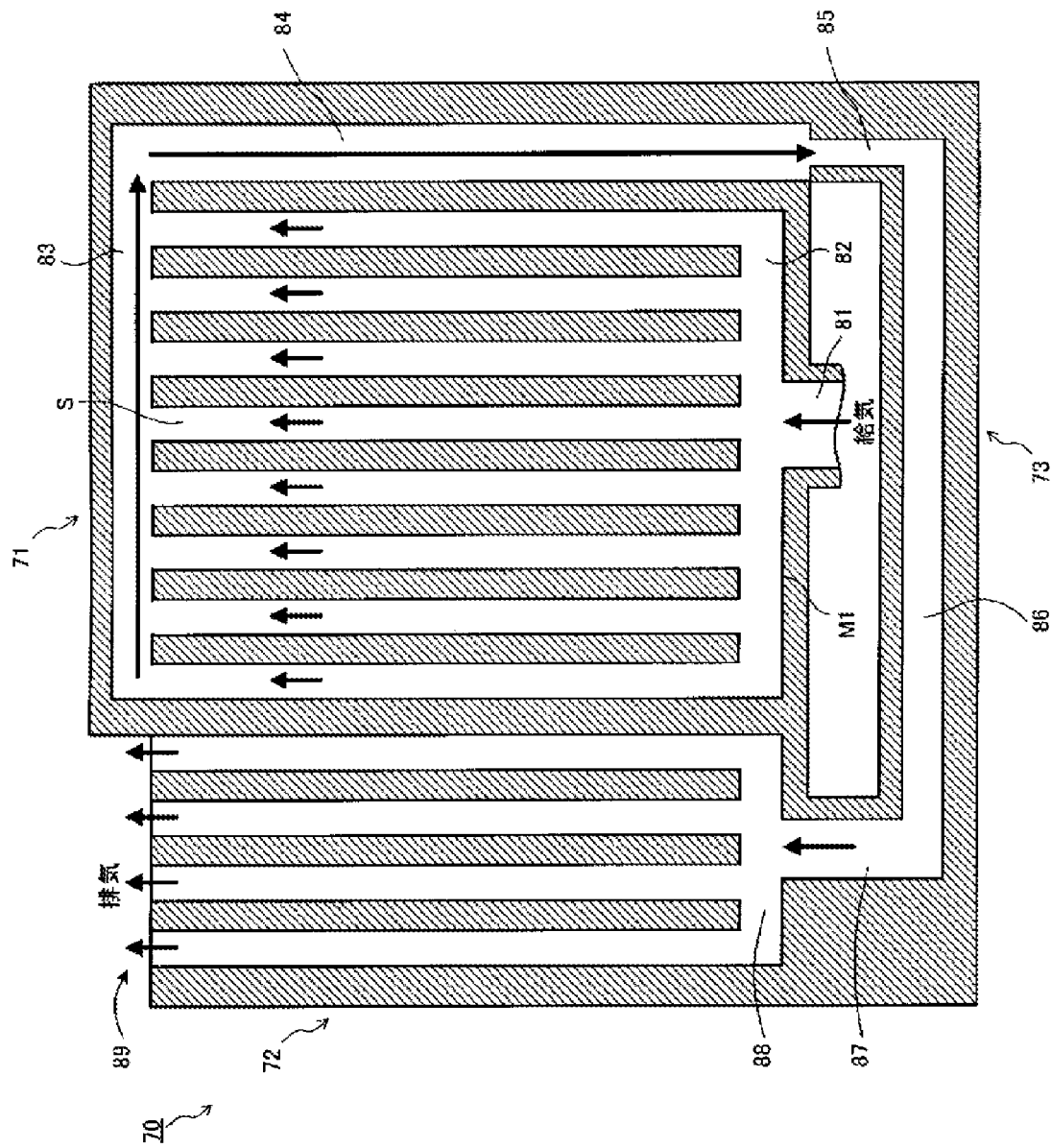
FIG. 12 Schematic view showing the interior of a fuel cell stack 70 according to a fifth embodiment.

A fifth embodiment will be described. FIG. 12 is a schematic view showing a solid oxide fuel cell stack 70 according to the fifth embodiment. The solid oxide fuel cell stack 70 has a tubular form in place of a flat-plate form and has a first block 71, a second block 72, and a throttling section 73. Each of the first block 71 and the second block 72 has a plurality of tubular fuel cells S. The number N2 of the fuel cells S in the second block 72 is smaller than the number N1 of the fuel cells S in the first block 71. The throttling section 73 is composed of channels 85 to 87 and is smaller in channel diameter than channels 81 to 84, 88, and 89 and throttles fuel gas.

Fuel gas flows in the order of the channels 81 and 82, the first block 71, the channels 83 and 84, the throttling section 73 (channels 85 to 87), the channel 88, the second block 72, and the channel 89.

The description of channels for oxidizer gas is omitted. Similar to the first embodiment, oxidizer gas can be parallelly supplied to the first block 71 and the second block 72. Also, similar to the second embodiment, the throttling section for oxidizer gas may be provided to supply oxidizer gas in the order of the first block 71, the throttling section for oxidizer gas, and the second block 72.

In this manner, even when the tubular fuel cells S instead of flat-plate ones are used, similar to the first and second embodiments, a good fuel utilization rate and uniform fuel distribution can be ensured.

The tubular shape encompasses a flat tubular shape. Even when flat tubular fuel cells S are used, similar to the first and second embodiments, a good fuel utilization rate and uniform fuel distribution can be ensured.

In the above embodiments, channels (fuel gas channels 24 (24a to 24d) and oxidizer gas channels 25 (25a and 25b)) are formed in the bolts 22 (22a to 22d) and 23 (23a and 23b), respectively, along their center axes. That is, hollow bolts having a hollow (channel) formed therein are used. The relation between a channel and a bolt is not limited thereto. In place of a hollow bolt, a solid bolt having no hollow (channel) formed therein may be used such that a channel is disposed externally of the bolt. For example, channels can be formed between the through holes 31 and 32 and the bolts 22 and 23, respectively (a bolt is disposed within a channel). Also, channels may be disposed separately from the bolts 22 and 23.

Comparative Example 1

Figure 13:
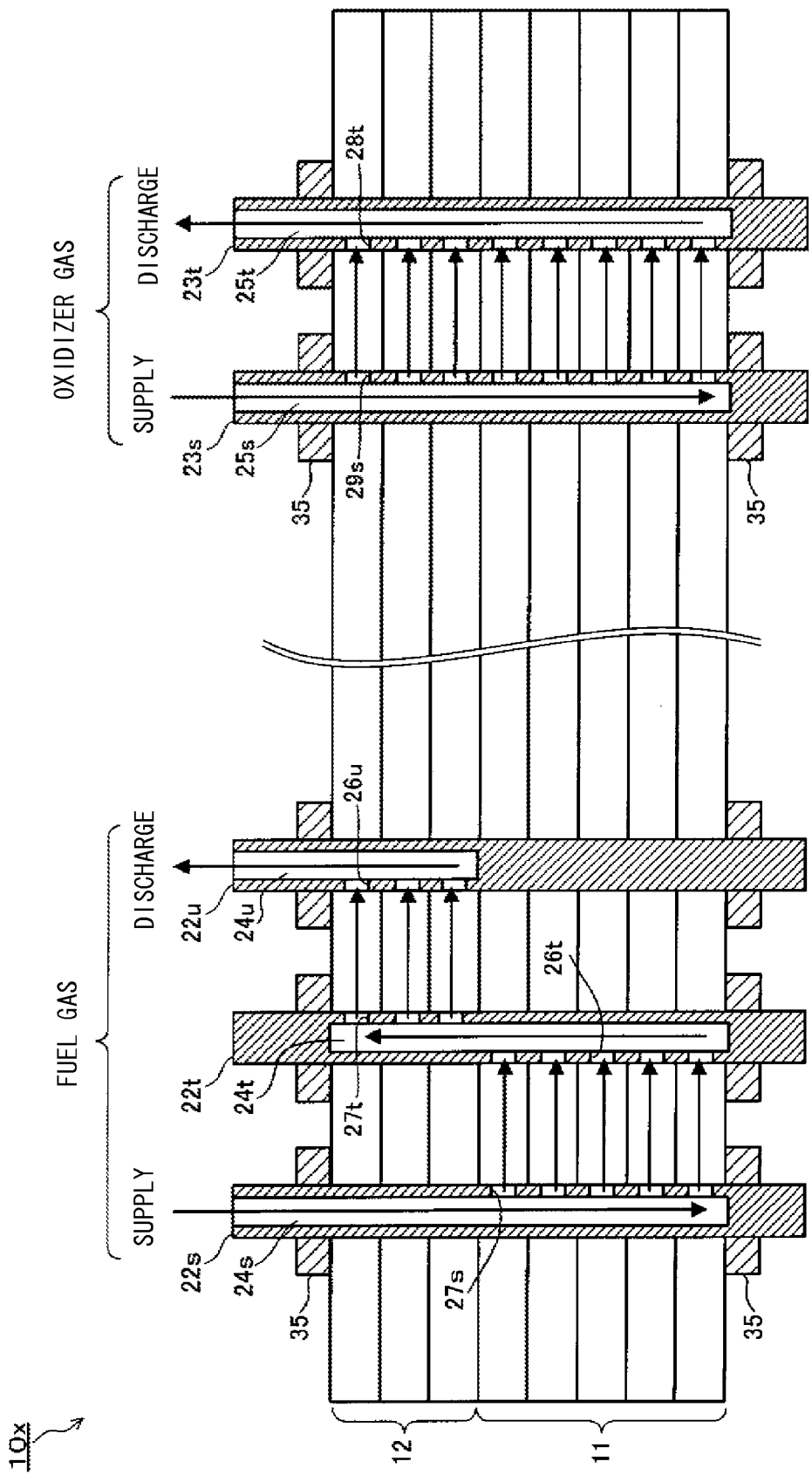
FIG. 13 Schematic view showing the interior of a fuel cell stack 10x according to comparative example 1.

FIG. 13 is a schematic view showing a solid oxide fuel cell stack 10x according to comparative example 1. The solid oxide fuel cell stack 10x has the first block 11, the second block 12, and the bolts 22 (22s to 22u) and 23 (23s and 23t). That is, the solid oxide fuel cell stack 10x does not have the throttling section 13, and fuel gas flows in the order of the first block 11 and the second block 12.

Since comparative example 1 does not have the throttling section 13, gas distribution to the first block 11 having a high utilization rate fails to be uniform, leading to deterioration in power generation efficiency.

Comparative Example 2

Figure 14:
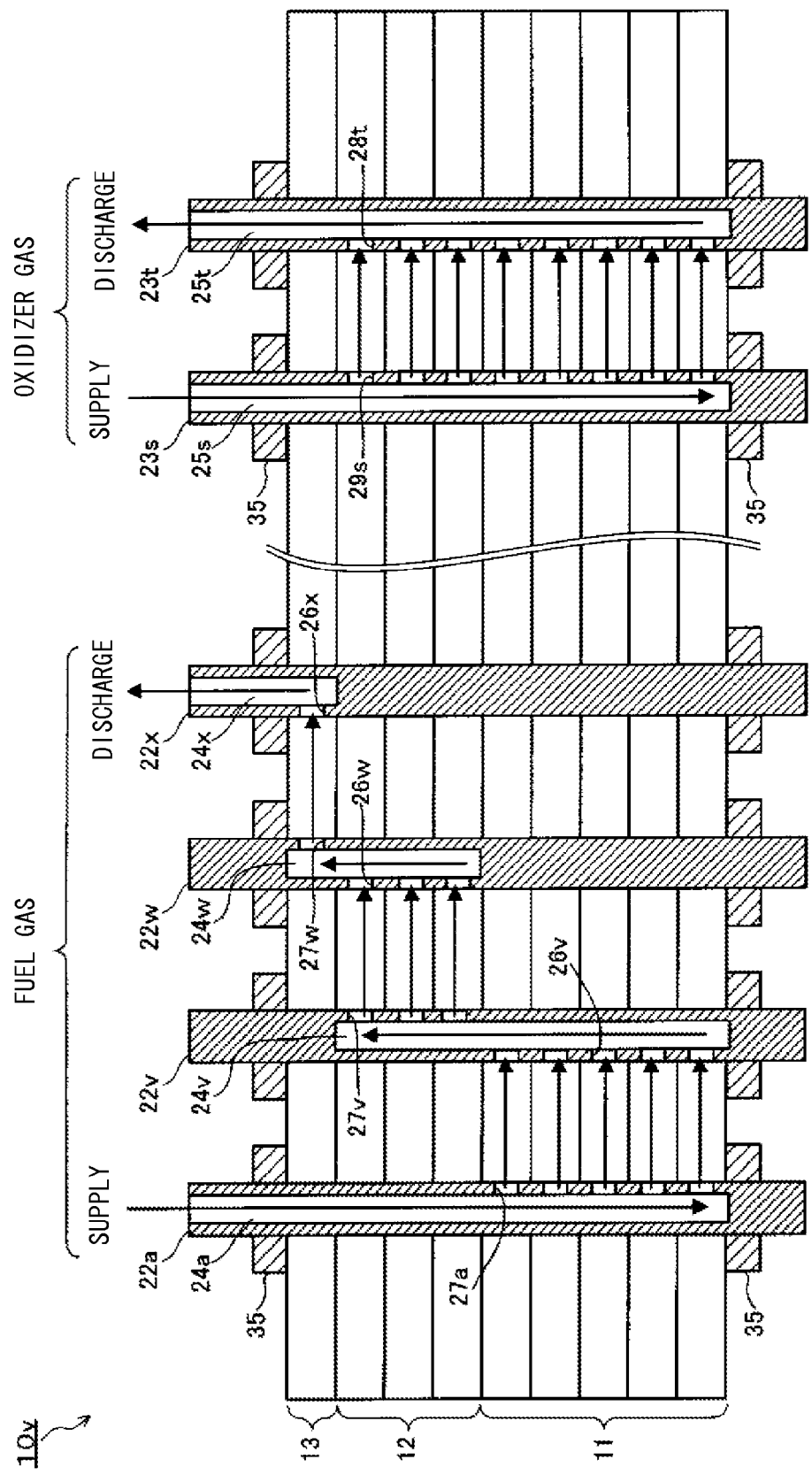
FIG. 14 Schematic view showing the interior of a fuel cell stack 10y according to comparative example 2.

FIG. 14 is a schematic view showing a solid oxide fuel cell stack 10y according to comparative example 2. The solid oxide fuel cell stack 10y has the first block 11, the second block 12, the throttling section 13, and the bolts 22 (22a and 22v to 22x) and 23 (23s and 23t). In comparative example 2, fuel gas flows in the order of the first block 11, the second block 12, and the throttling section 13.

Because of existence of the throttling section 13, pressure rises in both of the first and second blocks 11 and 12. In comparative example 2, since the throttling section 13 is disposed downstream of the second block 12, particularly, pressure rise (pressure loss) in the second block 12 may become excessive. The reason for this is described below.

In order to uniformly distribute fuel gas into each of the first and second blocks 11 and 12 (fuel cells 40 thereof) (to satisfy distributivity), pressure in each of the first and second blocks 11 and 12 must be increased to a certain extent. However, in order to satisfy distributivity in the first block 11, if pressure in the first block 11 is increased via the throttling section 13, pressure in the second block 12 may possibly increase above a level required for satisfying distributivity of the second block 12. This is for the following reason: the number N2 of the fuel cells 40 (the number of layers) in the second block 12 is smaller than the number N1 of the fuel cells 40 (the number of layers) in the first block 11. In this manner, there is a possibility that pressure increase (pressure loss) in the second block 12 becomes excessive.

An excessive increase in pressure within the second block 12 leads to an increase in pressure loss within the entire solid oxide fuel cell stack 10. As a result, leakage of fuel gas increases, potentially resulting in deterioration in power generation efficiency.

Examples

Next will be described the relation between fuel utilization rate and combinations of the numbers N1 and N2 of the fuel cells 40 of the first and second blocks 11 and 12.

FIGS. 15 to 19 are graphs showing utilization rates calculated according to combinations of the numbers of layers (the numbers N1 and N2 of the fuel cells 40) of the first and second blocks 11 and 12 on the basis of an overall fuel utilization rate of 80% at a current of 65 A. FIGS. 15 to 19 correspond to the total number of 30, 20, 19, 18, and 10 (N1+N2=30, 20, 19, 18, and 10), respectively.

The graphs show the number N1 and fuel utilization rates Y1 and Y2 of the first and second blocks 11 and 12, respectively. The graphs also show lower limits BL1 to BL5 and upper limits BH1 to BH5 of allowable ranges of the numbers N1 and N2.

Lower limits BL1 to BL5 are specified by the numbers of layers N1 and N2 of the first and second blocks 11 and 12, respectively, at a fuel utilization rate of 70% or less in the first block 11. At a fuel utilization rate of the first block 11 of 70% or higher, the fuel utilization rate of the first block 11 is close to the overall fuel utilization rate (80%), so that superiority fails to be obtained with respect to a fuel utilization rate characteristic.

Figure 15:
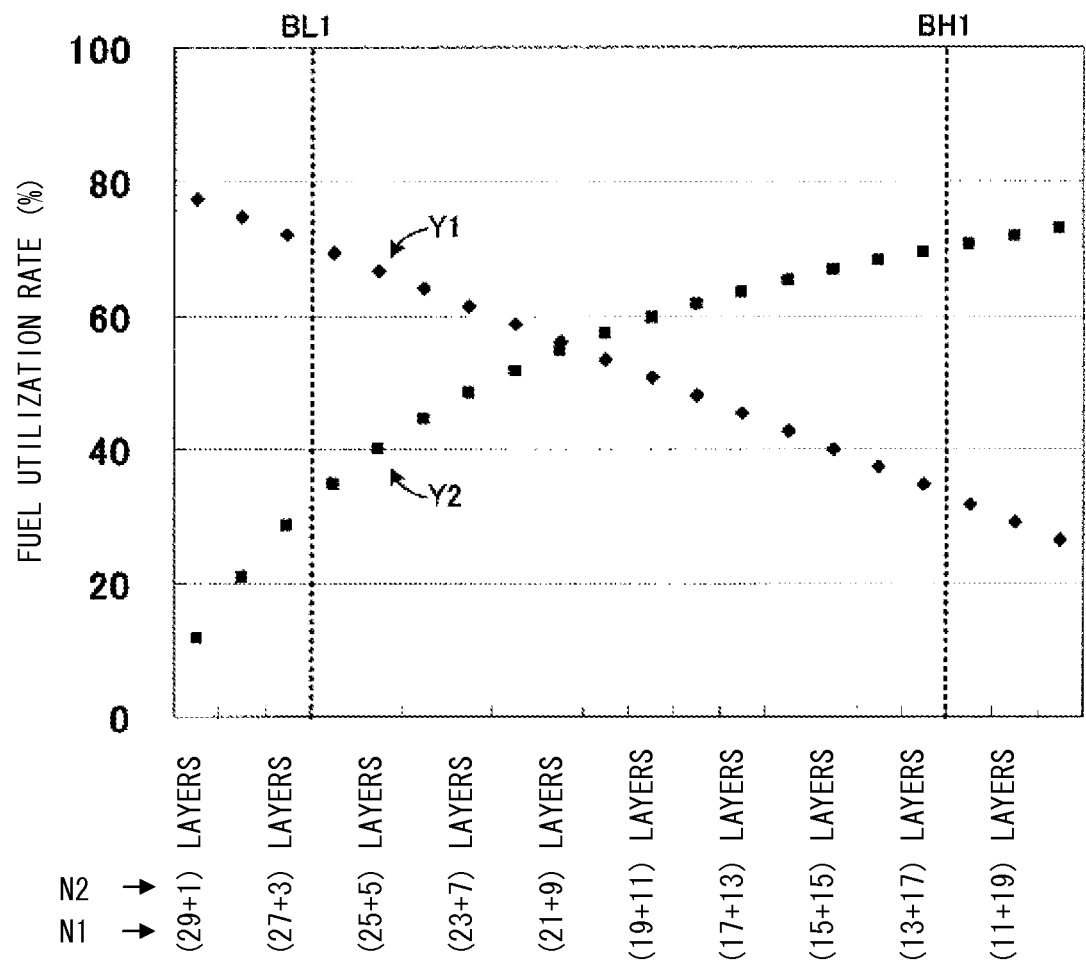
FIG. 15 Graph showing the relation between the number of layers of a fuel cell stack and fuel utilization rate.
Figure 16:
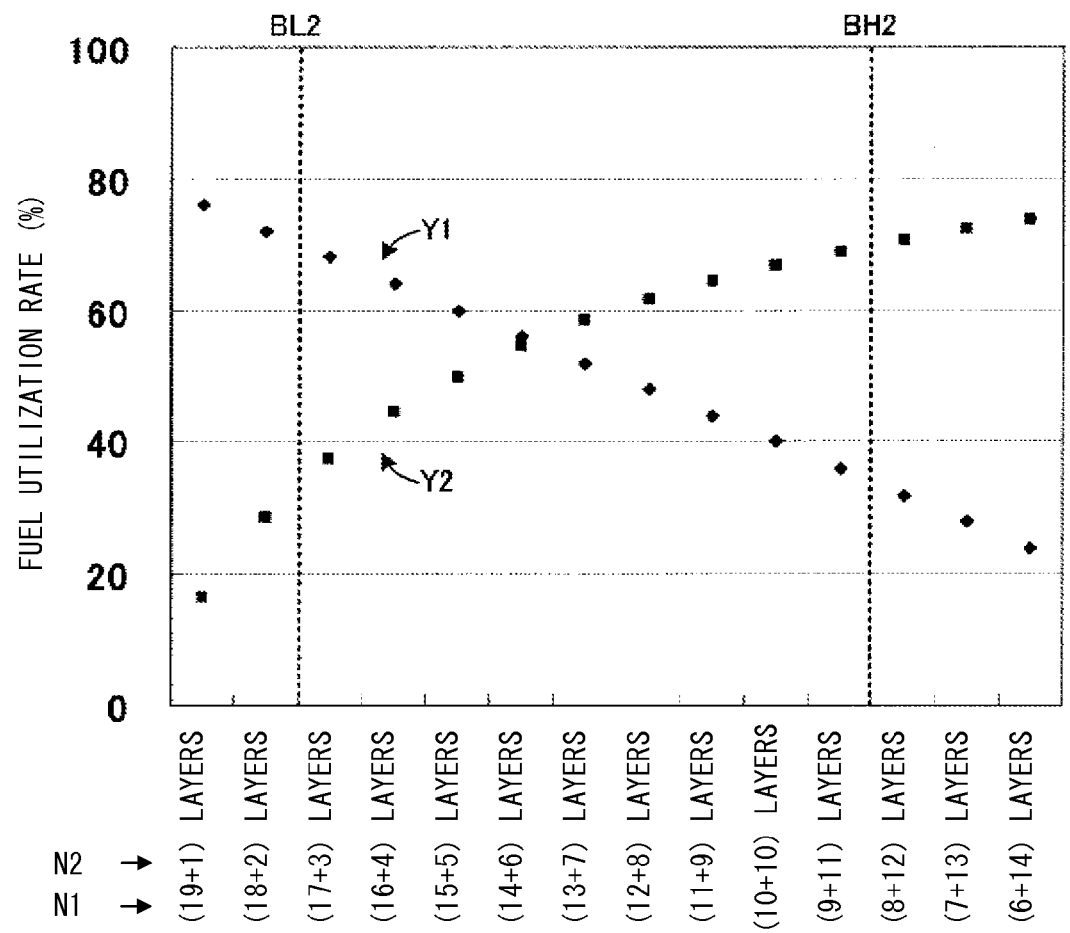
FIG. 16 Graph showing the relation between the number of layers of a fuel cell stack and fuel utilization rate.
Figure 17:
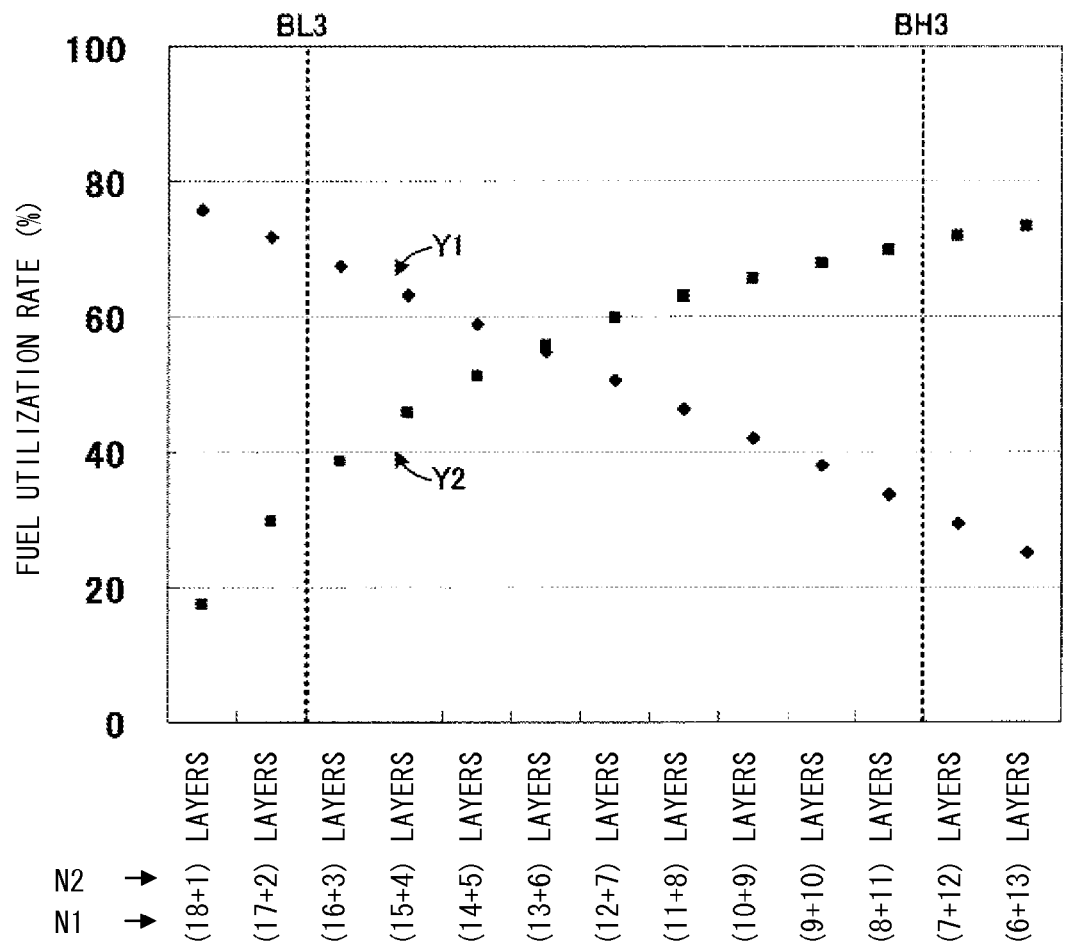
FIG. 17 Graph showing the relation between the number of layers of a fuel cell stack and fuel utilization rate.
Figure 18:
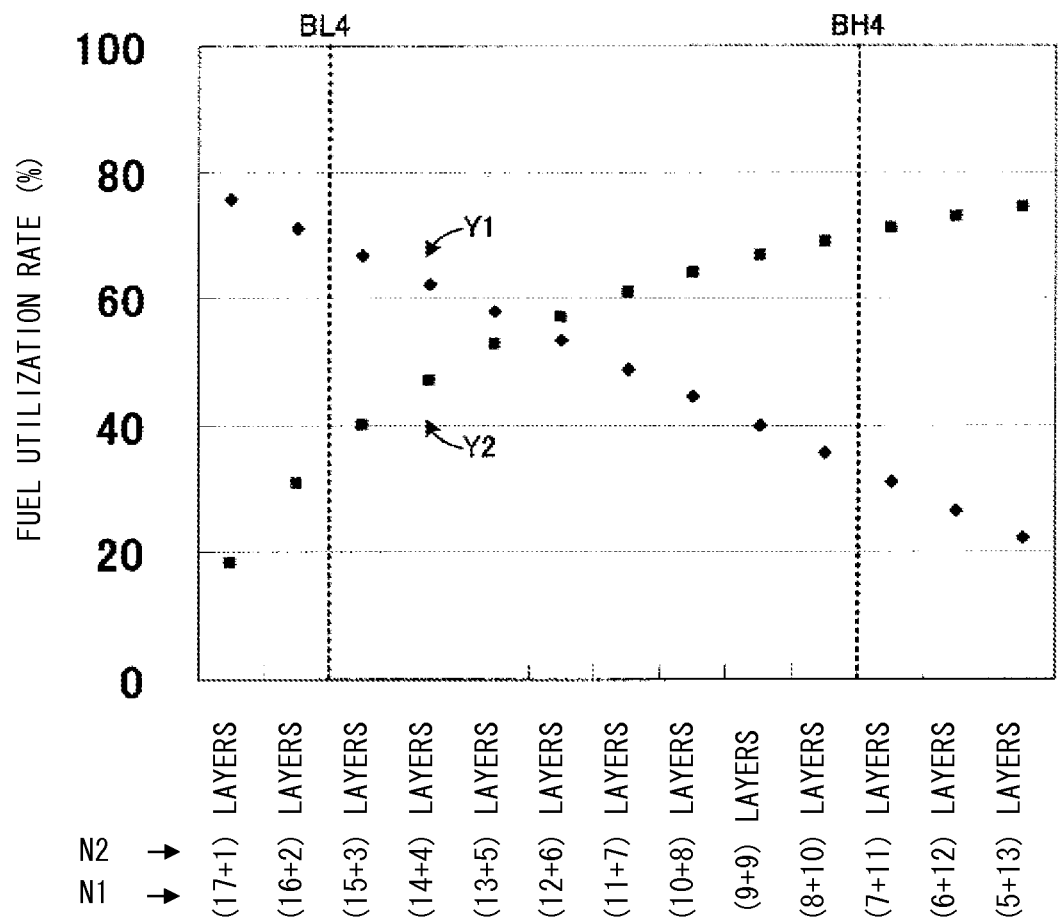
FIG. 18 Graph showing the relation between the number of layers of a fuel cell stack and fuel utilization rate.
Figure 19:
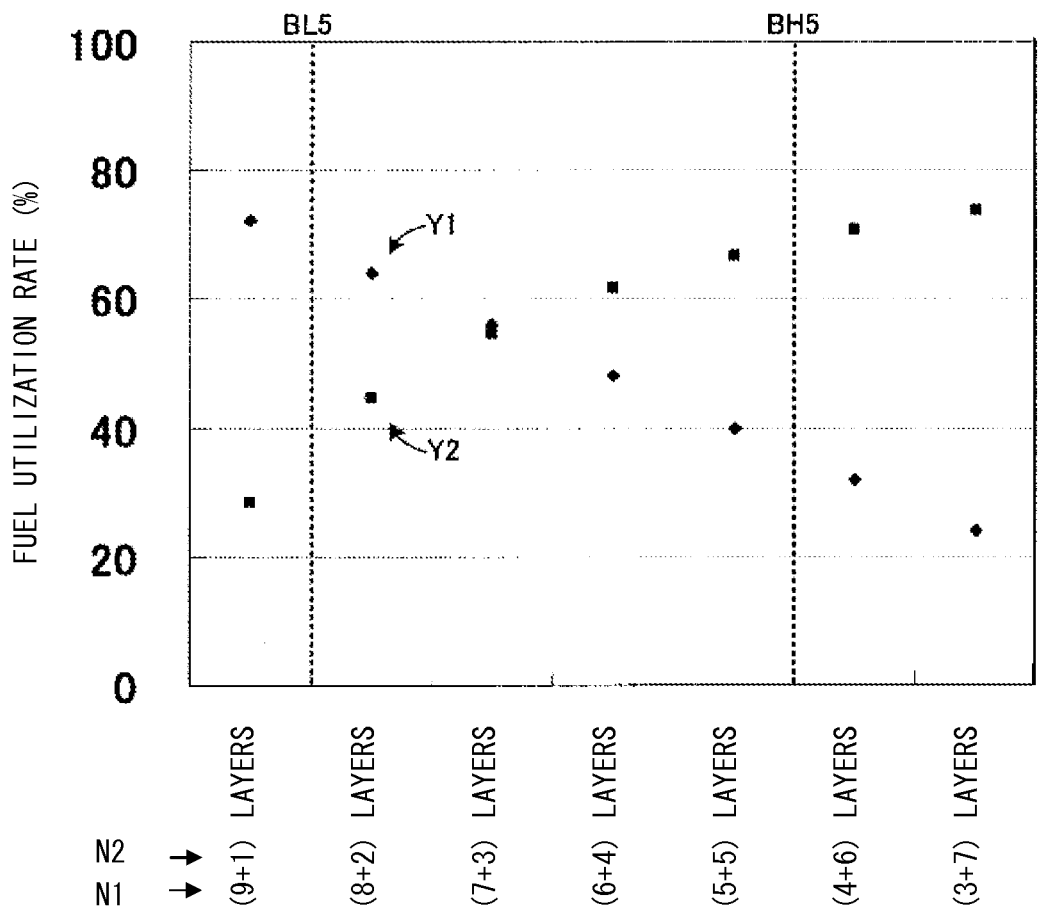
FIG. 19 Graph showing the relation between the number of layers of a fuel cell stack and fuel utilization rate.

The numbers of layers N1 and N2 at lower limits BL1 to BL5 are as follows.
FIG. 15: N1=26, N2=4, Y1=69.3%, Y2=34.8%
FIG. 16: N1=17, N2=3, Y1=68.0%, Y2=37.5%
FIG. 17: N1=16, N2=3, Y1=67.4%, Y2=38.7%
FIG. 18: N1=15, N2=3, Y1=66.7%, Y2=40.0%
FIG. 19: N1=8, N2=2, Y1=64.0%, Y2=44.4%

At this time, "N2/(N1+N2)=0.133, 0.150, 0.158, 0.167, and 0.200;" thus, it is understandable that the lower limit of "N2/(N1+N2)" can be 0.13.

Upper limits BH1 to BH5 are specified by the numbers of layers N1 and N2 of the first and second blocks 11 and 12, respectively, at a fuel utilization rate of 70% or less in the second block 12. At a fuel utilization rate of the second block 12 of 70% or higher, the fuel utilization rate of the second block 12 is close to the overall fuel utilization rate (80%), so that superiority fails to be obtained with respect to a fuel utilization rate characteristic.

The numbers of layers N1 and N2 at upper limits BH1 to BH5 are as follows.
FIG. 15: N1=13, N2=17, Y1=34.7%, Y2=69.4%
FIG. 16: N1=9, N2=11, Y1=36.0%, Y2=68.8%
FIG. 17: N1=8, N2=11, Y1=33.7%, Y2=69.8%
FIG. 18: N1=8, N2=10, Y1=35.6%, Y2=69.0%
FIG. 19: N1=5, N2=5, Y1=40.0%, Y2=66.7%

At this time, "N2/(N1+N2)=0.567, 0.550, 0.579, 0.556, and 0.500;" thus, it is understandable that the upper limit of "N2/(N1+N2)" can be 0.58.

Figure 20:
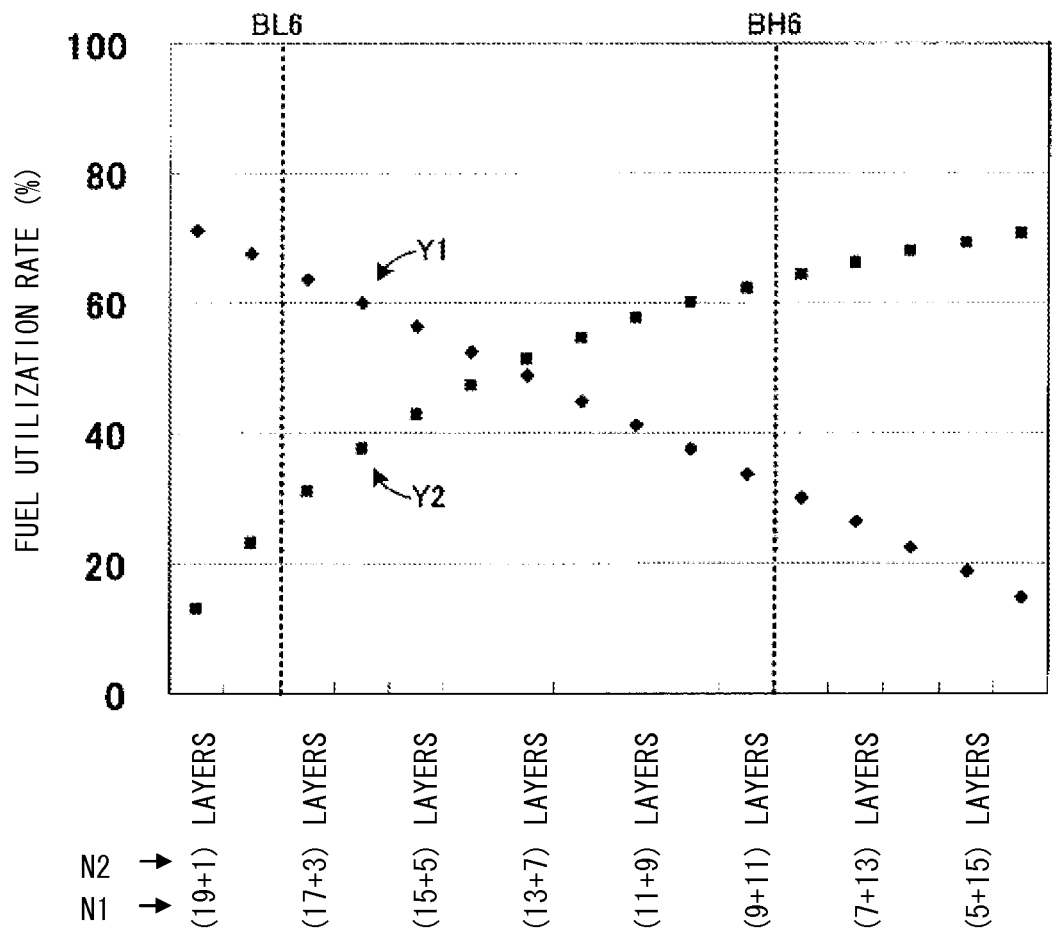
FIG. 20 Graph showing the relation between the number of layers of a fuel cell stack and fuel utilization rate.
Figure 21:
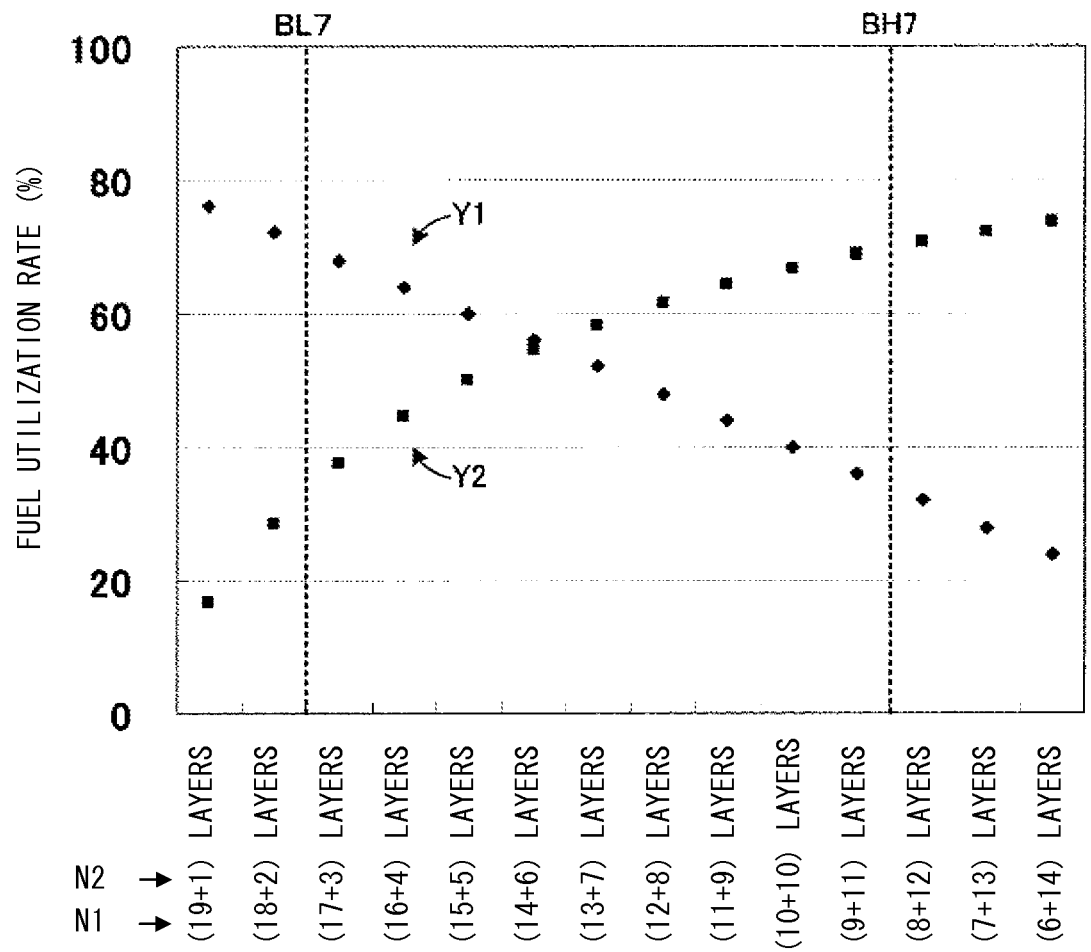
FIG. 21 Graph showing the relation between the number of layers of a fuel cell stack and fuel utilization rate.
Figure 22:
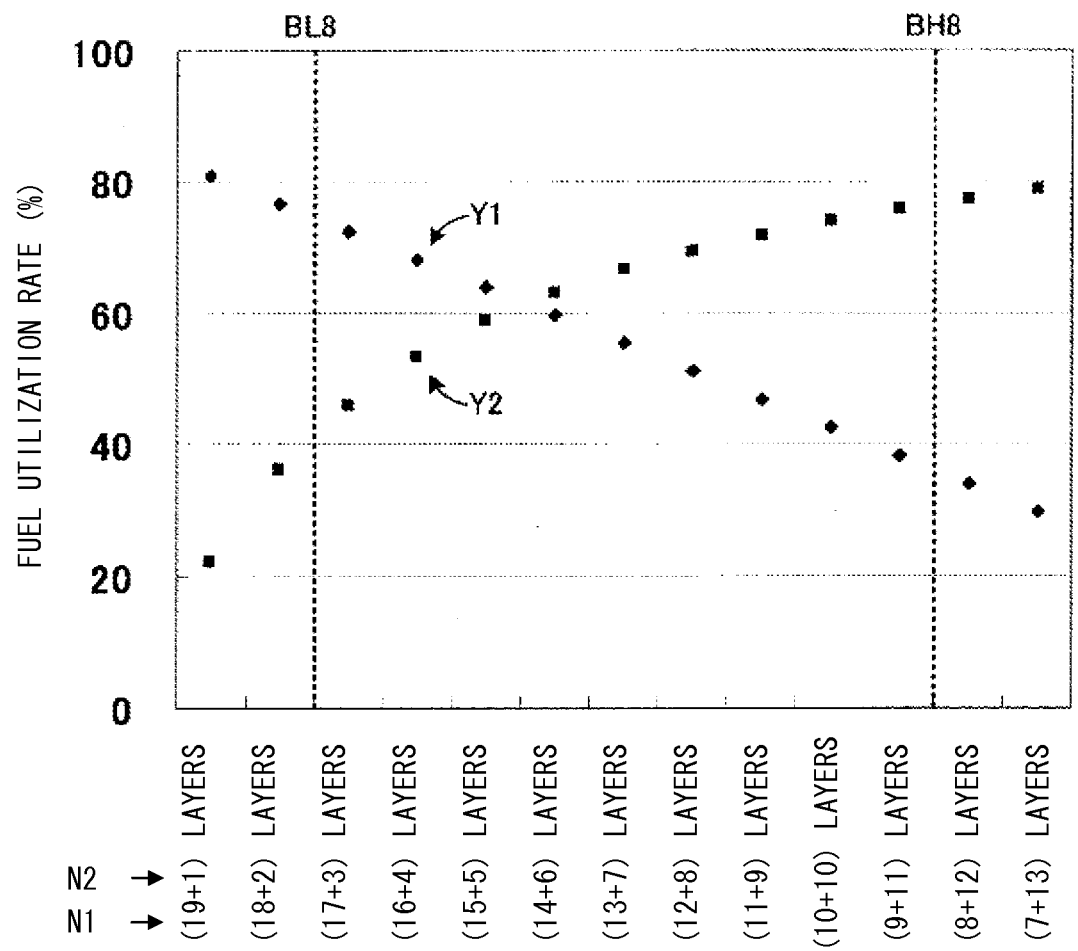
FIG. 22 Graph showing the relation between the number of layers of a fuel cell stack and fuel utilization rate.

FIGS. 20 to 22 are graphs showing utilization rates calculated according to combinations of the numbers of layers (the numbers N1 and N2 of the fuel cells 40) of the first and second blocks 11 and 12 on the basis of an overall fuel utilization rate of 75%, 80%, and 85%, respectively, in a 20-layer stack.

The numbers of layers N1 and N2 at lower limits BL6 to BL8 are as follows.
FIG. 20: N1=17, N2=3, Y1=63.8%, Y2=31.0%
FIG. 21: N1=17, N2=3, Y1=68.0%, Y2=37.5%
FIG. 22: N1=17, N2=3, Y1=72.3%, Y2=45.9%

At this time, "N2/(N1+N2)=0.150, 0.150, 0.150;" thus, the lower limit of "N2/(N1+N2)" can be 0.150.

The numbers of layers N1 and N2 at upper limits BH6 to BH8 are as follows.
FIG. 20: N1=9, N2=11, Y1=33.8%, Y2=62.3%
FIG. 21: N1=9, N2=11, Y1=36.0%, Y2=68.8%
FIG. 22: N1=9, N2=11, Y1=36.0%, Y2=66.8%

At this time, "N2/(N1+N2)=0.55, 0.55, 0.55;" thus, the upper limit of "N2/(N1+N2)" can be 0.55.

(Method of Manufacturing Fuel Cell Stack)

The fuel cell stack 10 can be manufactured, for example, as follows.

(1) Fabrication of Fuel Cells 40

For example, the frame section 43 is attached to the cell body 44 by brazing or the like. As shown in FIG. 2, the cell body 44 to which the frame section 43 is attached is sandwiched between the interconnectors 41 and 45 for stacking thereof, yielding the fuel cell 40. In this manner, a plurality of the fuel cells 40 are fabricated.

(2) Fabrication of Throttling Sections 13 and 14

The throttling sections 13 and 14 having any one of structures shown in FIGS. 5A to 5D and 6A to 6D are fabricated. For example, an electrically insulating plate of mica or the like is machined to a predetermined shape, yielding the insulating frame. Also, for example, a plate material of SUS is blanked into a predetermined shape, yielding the interconnector. The yielded insulating frame and interconnector are combined and stacked together, yielding the throttling section 13 or 14.

(3) Stacking and Fixing of First and Second Blocks 11 and 12 and Throttling Section 13 or 14

A plurality of the fabricated fuel cells 40 are combined and stacked, yielding the first block 11 and the second block 12. Furthermore, at least one of the throttling section 13 and the throttling section 14 is stacked with the first block 11 and the second block 13.

Next, the first block 11, the second block 12, and at least one of the throttling section 13 and the throttling section 14 in a stacked condition are fixed together by means of the bolts 21 to 23 and the nuts 35, yielding the solid oxide fuel cell stack 10 shown in FIG. 1, etc.

An unillustrated pair of end plates (current collecting plates) may be disposed as a top layer and a bottom layer of the solid oxide fuel cell stack 10. In this case, the pair of end plates, the first block 11, the second block 12, and the throttling sections 13 and 14 in a stacked condition can be fixed together by means of the bolts 21 to 23 and the nuts 35.

Other Embodiments

The present invention is not limited to the above embodiments, but may be embodied in expanded or modified forms, and such expanded or modified embodiments are encompassed by the technical scope of the present invention.

DESCRIPTION OF REFERENCE NUMERALS

10: solid oxide fuel cell stack
11: first block
12: second block
13, 14: throttling section
21 to 23: bolt
24: fuel gas channel
25: oxidizer gas channel
26: fuel gas inlet
27: fuel gas outlet
28: oxidizer gas inlet
29: oxidizer gas outlet
31, 32: through hole
33: through hole
35: nut
40: fuel cell
41, 45: interconnector
42: current collector
43: frame section
44: cell body
45: separator
46: opening
47: oxidizer gas channel
48: fuel gas channel
51: cathode frame
52: insulating frame
54: anode frame
55: cathode
56: solid electrolyte
57: anode
61, 62: cut

The invention claimed is:

1. A fuel cell stack comprising:
a first block having a first number of cells;
a first fuel supply channel having a first fuel gas trunk channel and first branch channels branching off from the first fuel gas trunk channel, and adapted to parallelly supply the cells of the first block with fuel gas;
a collecting channel for collecting the fuel gas which has passed through the cells of the first block;
a second block having a second number of cells, the second number being smaller than the first number;
a second fuel supply channel having a second fuel gas trunk channel and second branch channels branching off from the second fuel gas trunk channel, and adapted to parallelly supply the cells of the second block with the fuel gas which has passed through the cells of the first block and has been collected into the collecting channel; and
a discharge channel for discharging the fuel gas which has passed through the cells of the second block, from the second block to an external section;
the first fuel supply channel, the first block, the collecting channel, the second fuel supply channel, the second block, and the discharge channel being arranged sequentially from an upstream side along a direction of flow of the fuel gas;
the fuel cell stack being characterized in that a throttling section capable of throttling the fuel gas and smaller in channel diameter than the first and second fuel gas trunk channels, the first and second branch channels, the collecting channel, and the discharge channel is provided at a position located downstream of the collecting channel and upstream of the second fuel supply channel; and
the throttling section comprises a channel connecting the collecting channel to the second fuel supply channel and a cross-sectional area of the channel of the throttling section is smaller than any one of: a cross-sectional area of the first and second fuel gas trunk channels; a cross-sectional area of the first and second branch channels; a cross-sectional area of the collecting channel; and a cross-sectional area of the discharge channel.

2. A fuel cell stack according to claim 1, wherein a relational expression $N2/(N1+N2) \leq 0.47$ is satisfied, where N1 is the first number, and N2 is the second number.

3. A fuel cell stack according to claim 2, wherein a relational expression $N2/(N1+N2) \geq 0.13$ is satisfied, where N1 is the first number, and N2 is the second number.

4. A fuel cell stack according to claim 1, wherein the first block is disposed between the second block and the throttling section and is in thermally conductive contact with the second block and the throttling section.

5. A fuel cell stack according to claim 1, wherein
the cells are each in the form of a flat plate, and
each of the first block and the second block is a stack of the cells stacked along a cell thickness direction.

6. A fuel cell stack according to claim 5, wherein the throttling section has an outline corresponding to a planar outline of the cells and is stacked together with the cells along the stacking direction.

7. A fuel cell stack according to claim 1, characterized by further comprising:
a first oxidizer supply channel having a first oxidizer gas trunk channel and third branch channels branching off from the first oxidizer gas trunk channel, and adapted to parallelly supply the cells of the first and second blocks with oxidizer gas, and an oxidizer gas discharge channel for discharging the oxidizer gas which has passed through the cells of the first and second blocks, from the first and second blocks to an external section.

8. A fuel cell stack according to claim 1, further comprising:

a first oxidizer supply channel having a first oxidizer gas trunk channel and third branch channels branching off from the first oxidizer gas trunk channel, and adapted to parallelly supply the cells of the first block with oxidizer gas;

a second collecting channel for collecting the oxidizer gas which has passed through the cells of the first block;

a second oxidizer supply channel having a second oxidizer gas trunk channel and fourth branch channels branching off from the second oxidizer gas trunk channel, and adapted to parallelly supply the cells of the second block with the oxidizer gas which has passed through the cells of the first block and has been collected into the second collecting channel; and a second discharge channel for discharging the oxidizer gas which has passed through the cells of the second block, from the second block to an external section;

the first oxidizer supply channel, the first block, the second collecting channel, the second oxidizer supply channel, the second block, and the second discharge channel being arranged sequentially from an upstream side along a direction of flow of the oxidizer gas;

wherein a second throttling section capable of throttling the oxidizer gas and smaller in channel diameter than the first and second oxidizer gas trunk channels, the third and fourth branch channels, the second collecting channel, and the second discharge channel is provided at a position located downstream of the second collecting channel and upstream of the second oxidizer supply channel; and the second throttling section comprises a channel connecting the second collecting channel to the second oxidizer supply channel, and a cross-sectional area of the channel of the second throttling section is smaller than any one of: a cross-sectional area of the first and second oxidizer gas trunk channels; a cross-sectional area of the third and fourth branch channels; a cross-sectional area of the second collecting channel; and a cross-sectional area of the second discharge channel.

* * * * *